United States Patent
Byun et al.

(10) Patent No.: US 8,024,758 B2
(45) Date of Patent: Sep. 20, 2011

(54) METHOD FOR PROVIDING A CALL SERVICE AND A BROADCAST SERVICE, AND DIGITAL MULTIMEDIA BROADCASTING TERMINAL THEREFOR

(75) Inventors: Ki-Jong Byun, Yongin-si (KR); Sung-Min Kang, Seoul (KR); Dae-Suk Chung, Suwon-si (KR); Sun-Hee Chang, Suwon-si (KR); Su-Jin Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 878 days.

(21) Appl. No.: 11/436,076

(22) Filed: May 17, 2006

(65) Prior Publication Data

US 2006/0265726 A1 Nov. 23, 2006

(30) Foreign Application Priority Data

May 17, 2005 (KR) .................. 10-2005-0041351
Jul. 6, 2005 (KR) .................. 10-2005-0060792

(51) Int. Cl.
*H04N 7/16* (2011.01)
(52) U.S. Cl. ............. 725/62; 725/99; 725/122; 725/123; 348/14.1
(58) Field of Classification Search .............. 725/62, 725/99, 122, 123; 348/14.01
See application file for complete search history.

(56) References Cited

U.S. PATENT DOCUMENTS

| | | | | |
|---|---|---|---|---|
| 5,890,071 A * | 3/1999 | Shimanuki | ............... | 455/567 |
| 6,529,742 B1 * | 3/2003 | Yang | ............... | 455/556.1 |
| 6,981,275 B1 | 12/2005 | Maeda et al. | | |
| 7,031,746 B2 * | 4/2006 | Na et al. | ............... | 455/550.1 |
| 7,623,186 B2 * | 11/2009 | Seong | ............... | 348/552 |
| 7,627,349 B2 * | 12/2009 | Vetelainen et al. | ............... | 455/566 |
| 2004/0055011 A1 * | 3/2004 | Bae et al. | ............... | 725/62 |
| 2004/0091090 A1 * | 5/2004 | Hong et al. | ............... | 379/102.03 |
| 2004/0101046 A1 | 5/2004 | Yang et al. | | |
| 2004/0177378 A1 * | 9/2004 | Cool | ............... | 725/89 |
| 2004/0209644 A1 * | 10/2004 | Chang et al. | ............... | 455/556.1 |
| 2005/0032507 A1 * | 2/2005 | Na et al. | ............... | 455/414.1 |
| 2005/0041696 A1 | 2/2005 | Pekonen | | |
| 2005/0070327 A1 * | 3/2005 | Watanabe | ............... | 455/552.1 |
| 2005/0099893 A1 | 5/2005 | Jyrinki | | |
| 2005/0143053 A1 * | 6/2005 | Virtanen et al. | ............... | 455/414.1 |
| 2006/0020991 A1 * | 1/2006 | Goto | ............... | 725/106 |
| 2006/0258396 A1 * | 11/2006 | Matsuoka | ............... | 455/556.1 |

(Continued)

FOREIGN PATENT DOCUMENTS

EP 0 946 028 9/1999

(Continued)

*Primary Examiner* — Pankaj Kumar
*Assistant Examiner* — Mulugeta Mengesha
(74) *Attorney, Agent, or Firm* — The Farrell Law Firm, P.C.

(57) ABSTRACT

While a user uses one service in a digital multimedia broadcasting receiving terminal, there is implemented a function for suspending the service currently being used and enabling a different service to be used when the different service is provided. A function for enabling a call service to be used during a broadcast service is implemented. A call screen is displayed in a state in which a broadcast service connection is maintained, such that the user can use a new call service without stopping the broadcast service currently being used. In this concurrent service, switching between the call screen and a broadcast screen is possible. This display method can prevent images of the respective services from overlapping with each other and can provide one service without stopping another service.

10 Claims, 26 Drawing Sheets

U.S. PATENT DOCUMENTS

2007/0091832 A1* 4/2007 Lee .................. 370/310
2007/0139514 A1* 6/2007 Marley ............... 348/14.01

FOREIGN PATENT DOCUMENTS

| | | |
|---|---|---|
| EP | 0 967 773 | 12/1999 |
| EP | 1 501 221 | 1/2005 |
| JP | 2000-165772 | 6/2000 |
| JP | 2002-118656 | 4/2002 |
| JP | 2003-153111 | 5/2003 |
| JP | 2004-242278 | 8/2004 |
| JP | 2005-072803 | 3/2005 |
| JP | 2005-109819 | 4/2005 |
| JP | 2005-110067 | 4/2005 |
| JP | 2005-117172 | 4/2005 |
| JP | 2005-151338 | 6/2005 |
| JP | 2005-242714 | 9/2005 |
| KR | 1020050010550 | 1/2005 |
| TW | 574807 | 2/2004 |
| TW | 200412726 | 7/2004 |
| WO | WO/2002/087125 | 10/2002 |
| WO | WO 03/081878 | 10/2003 |
| WO | WO 2004084527 A1 * | 9/2004 |

* cited by examiner

WHEN CALL IS RECEIVED FROM THIRD PERSON (a)

(b)

METHOD FOR PROVIDING A CALL SERVICE AND A BROADCAST SERVICE, AND DIGITAL MULTIMEDIA BROADCASTING TERMINAL THEREFOR

PRIORITY

This application claims priority under 35 U.S.C. §119 to two applications entitled "Method for Providing a Call Service and a Broadcast service, and Digital Multimedia Broadcasting Terminal Therefor" filed in the Korean Intellectual Property Office on May 17, 2005 and Jul. 6, 2005 and assigned Serial Nos. 2005-41351 and 2005-60792, the contents of both of which are incorporated herein by reference.

BACKGROUND OF THE INVENTION

1. Field of the Invention

The present invention generally relates to a terminal which can provide a digital multimedia broadcasting (DMB) service, and more particularly to a method and DMB terminal for providing a call service and a broadcast service according to a concurrent service while performing a switching operation between the call service and the broadcast service.

2. Description of the Related Art

Generally, digital broadcasting is a broadcasting service for providing users with high-quality images and sounds and high-level services, which can replace the conventional analog broadcasting. The digital broadcasting service is popular with users and allows them to watch digital broadcasts while they are on the move and has recently increased with the development of digital broadcasting technology and mobile communication technology. Specifically, the interest with a digital multimedia broadcasting (DMB) service using a mobile communication terminal is increasing. DMB is a broadcasting service through which the users can watch various digital broadcasts of multiple channels by means of a personal portable receiver or a vehicle receiver equipped with an omni-directional receive antenna while they are on the move.

A third-generation (3G) mobile communication system developed for the purpose of multimedia transmission is differentiated from many conventional systems by a high-quality image service, fast data transmission rate, and so on. With the development of multimedia technology, for example, one screen can be shared between foreground and background processes also in a screen control scheme of a terminal. The foreground process is a process for controlling a high-priority application to be executed. The background process is a process for executing a low-priority application only when the high-priority application is not executed.

A terminal screen includes a foreground screen immediately executable by the user and a background screen being continuously executed within the terminal.

One of the current DMB terminals provides one screen for executable services. Accordingly, while a service is currently being executed, a different service can be started only if the service currently being executed is stopped when the different service is added.

SUMMARY OF THE INVENTION

However, there is a problem in that the conventional display control scheme must stop broadcast reproduction when a high-priority incoming call is received while a low-priority broadcast service is provided. Moreover, there is another problem in that the conventional display control scheme is not suitable to process a concurrent service in a DMB terminal.

As described above, only a single service can be provided in the conventional terminal capable of receiving DMB. Accordingly, while the user uses a broadcast service, another service, for example a call service, can be used after the broadcast service is stopped when the call service is incoming. When desiring to use the call service during the broadcast service, the user must stop the service of a broadcast currently being watched. While the conventional DMB terminal provides the broadcast service, it cannot simultaneously provide another service along with the broadcast service.

The present invention, therefore, provides a method and digital multimedia broadcasting (DMB) terminal for providing a concurrent service that can efficiently provide a call service during a broadcast service in the DMB terminal.

Moreover, the present invention provides a method and digital multimedia broadcasting (DMB) terminal for providing a call service and a broadcast service such that the respective services provided concurrently can be efficiently displayed on a screen.

Moreover, the present invention provides a method and digital multimedia broadcasting (DMB) terminal for concurrently providing a call service and a broadcast service such that a user can easily perform a switching operation between the respective services using a predetermined key in the DMB terminal.

In accordance with an aspect of the present invention, there is provided a method for concurrently providing a call service and a broadcast service in a digital multimedia broadcasting (DMB) terminal, including determining if a call service request is present while broadcast service mode is performed; and suspending the broadcast service mode in response to the call service request, stopping an output of an audio/video signal of the broadcast service mode, and outputting an audio/video signal of requested call service mode.

In accordance with another aspect of the present invention, there is provided a method for providing a call service and a broadcast service in a digital multimedia broadcasting (DMB) terminal, including determining if a received call is present while broadcast service mode is performed; displaying a message asking if a call connection is required according to the received call; and suspending the broadcasting service mode if the call connection is selected in the message, stopping an audio/video signal of the broadcast service mode, and outputting an audio/video signal of call service mode.

In accordance with another aspect of the present invention, there is provided a digital multimedia broadcasting (DMB) terminal for concurrently providing a call service and a broadcast service, including a controller for suspending broadcast service mode and stopping processing an audio/video signal of the broadcast service mode when a call service request is made while the broadcast service mode is performed, and processing an audio/video signal of requested call service mode; a display unit for displaying the video signals of the respective service modes on a main screen and a sub-screen under control of the controller; and an audio processor for outputting an audio signal processed in the controller.

In accordance with another aspect of the present invention, there is provided a method for providing a call service and a broadcast service in a digital multimedia broadcasting (DMB) terminal, including determining if a call service request is present while broadcast service mode is performed; and superimposing and displaying data of requested call service mode while outputting an audio/video signal of the broadcast service mode in response to the call service request.

In accordance with yet another aspect of the present invention, there is provided a method for providing a call service and a broadcast service in a digital multimedia broadcasting (DMB) terminal, including determining if a call service request is present while broadcast service mode is performed; stopping an output of an audio signal of the broadcast service mode while outputting a screen mapped to the broadcast service mode in response to the call service request, and outputting an audio signal of requested call service mode; and superimposing and displaying data of the requested call service mode on the screen mapped to the broadcast service mode.

BRIEF DESCRIPTION OF THE DRAWINGS

The above and other aspects and advantages of the present invention will be more clearly understood from the following detailed description taken in conjunction with the accompanying drawings, in which.

DETAILED DESCRIPTION OF THE PREFERRED EMBODIMENTS

Figure 1:
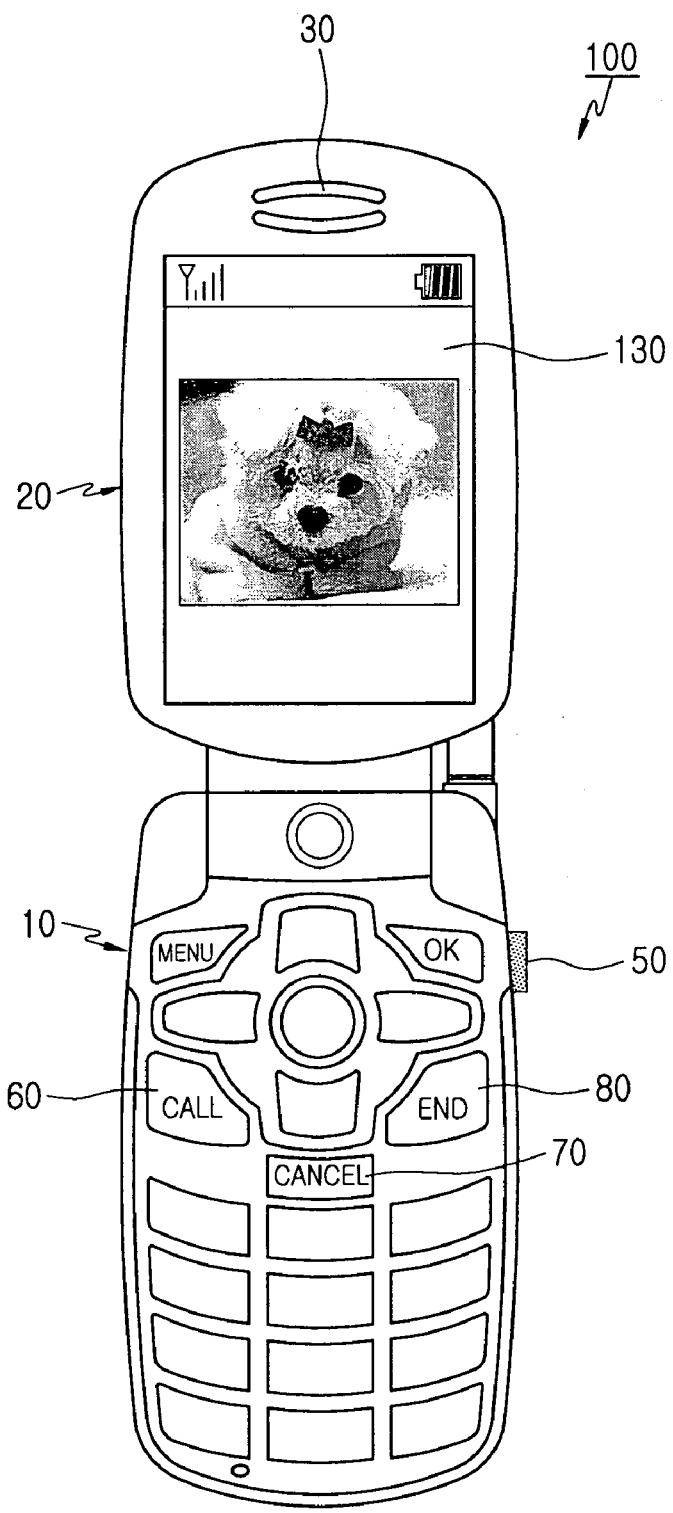
FIG. 1 illustrates a folder type terminal corresponding to an example of a terminal to which the present invention is applied.

Preferred embodiments of the present invention will be described in detail herein below with reference to the accompanying drawings. In the drawings, the same or similar elements are denoted by the same reference numerals even though they are depicted in different drawings. In the following description, detailed descriptions of functions and configurations incorporated herein that are well known to those skilled in the art are omitted for clarity and conciseness.

While a user uses a first service in a digital multimedia broadcasting (DMB) receiving terminal, the present invention implements a function for suspending the first service currently being used and enabling a different second service to be used when the second service is provided. Specifically, the present invention implements a function for enabling a call service to be used during a broadcast service. For this, the present invention displays a call screen while maintaining a broadcast service connection, such that the user can use a new call service without stopping the broadcast service currently being used. In this concurrent service, switching between the call screen and a broadcast screen is possible. This display method can prevent images of the respective services from overlapping with each other and can provide one service without stopping another service.

Before the detailed description of the present invention, the concurrent service used in the present invention will be briefly described. The term "concurrent service" means a service in which the terminal can receive one service without stopping another service. Specifically, the concurrent service in the present invention indicates the case where the user can use the call service during use of the broadcast service.

In accordance with the present invention, the DMB terminal requires a function capable of selectively using each service such that the concurrent service is possible. Accordingly, a predetermined key is required to select an associated service.

A folder type terminal corresponding to an example of a terminal to which the present invention is applied will be described with reference to FIG. 1.

The folder type terminal 100 includes a main body 10 and a sub-body 20 capable of being rotated at a predetermined angle on the main body 10. Conventionally, a speaker 30 is positioned on the surface of the sub-body 20, and a display unit 130 for displaying data is provided below the speaker 30 as illustrated in FIG. 1. As an input means for inputting data, a key input unit 160 with a plurality of key buttons is installed on the main body 10.

Specifically, a call key 60 and a broadcast key 50 of the key input unit 160 are used as dedicated keys for switching between the call service and the broadcast service. More specifically, the broadcast key 50 for executing the broadcast service may be realized by setting a dedicated key on the keypad or a combination of the existing keys as illustrated in FIG. 1. A cancel key 70 is a means for stopping one application. When the user presses the cancel key 70 while multiple applications are executed, the highest-level application is stopped and simultaneously an application next thereto is displayed. An end key 80 is a key used for stopping all applications currently being executed and switching to an idle state.

Figure 2:
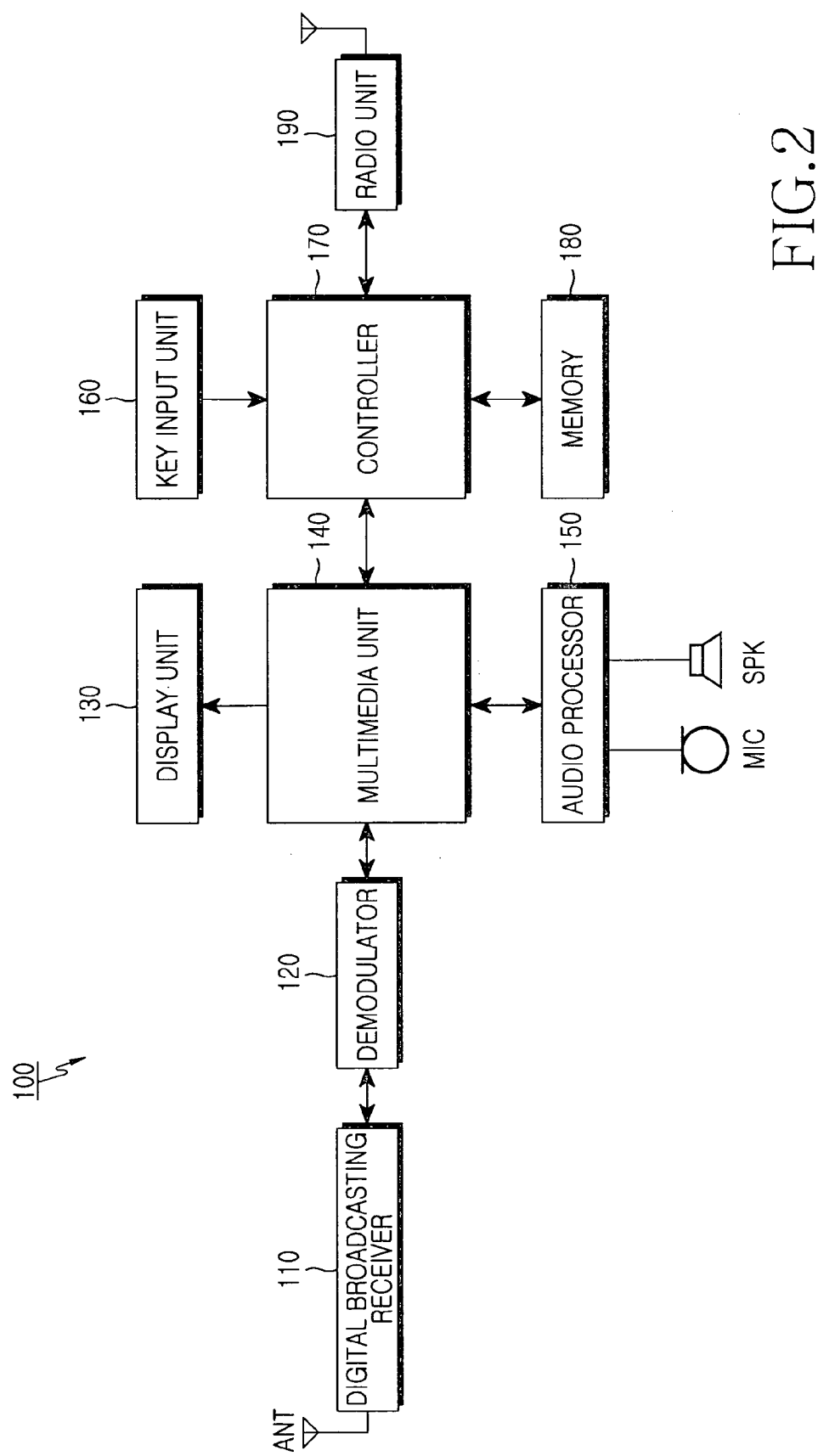
FIG. 2 is a block diagram illustrating an internal structure of a digital multimedia broadcasting (DMB) terminal for providing a concurrent service in accordance with an embodiment of the present invention.

FIG. 2 is a block diagram illustrating an internal structure of a DMB terminal for providing a concurrent service in accordance with an embodiment of the present invention.

Referring to FIG. 2, the DMB terminal 100 includes a digital broadcasting receiver 110, a demodulator 120, a display unit 130, a multimedia unit 140, an audio processor 150, a key input unit 160, a controller 170, a memory 180, and a radio unit 190.

The digital broadcasting receiver 110 receives digital broadcasting data through an antenna and then outputs the received digital broadcasting data to the demodulator 120. The demodulator 120 demodulates the digital broadcasting data and then outputs the demodulated digital broadcasting data to the multimedia unit 140.

The multimedia unit 140 functions as a controller in a digital broadcasting time. The multimedia unit 140 parses the digital broadcasting data, transferred through the demodulator 120 from the digital broadcasting receiver 110, into a video signal and an audio signal. The video signal and the audio signal are output from the multimedia unit 140 to the display unit 130 and the audio processor 150, respectively.

Under control of the controller 170, the display unit 130 receives and displays key input data input from the key input unit 160 or allows the user to visually see a necessary function to be set or driven. In accordance with the present invention, the display unit 130 displays a screen varying with a key input in a concurrent service time under the control of the controller 170. For example, when a call service is selected during a broadcast service, a call screen is displayed as a main screen on the entire screen but a displayed broadcast service moves to a sub-screen and is not viewed. In this state, when the broadcast service is again selected, the broadcast screen is displayed as the main screen but the call screen corresponding to the sub-screen is not viewed. As call service mode is performed, the display unit 130 receives an on screen display (OSD) signal generated from the controller 170, superimposes the OSD signal on a video signal based on parsing, and outputs a result of the superimposition. When the call service is incoming during the broadcast service, the call service mode can be displayed on the broadcast screen through an OSD scheme. Accordingly, the user can see the call service state while watching DMB. Data of the call service mode, i.e., data of call reception/transmission, can be superimposed and displayed on the broadcast screen using the OSD scheme. Alternatively, the data of the call reception/transmission may be displayed on the broadcast screen using a pop-up window scheme. Alternatively, the data of the call reception/transmission may be displayed using a slide scheme.

In an embodiment of the present invention, it is assumed that a main screen is a screen displayed on the display unit 130 of the terminal and a sub-screen is a non-displayed screen. However, in another embodiment of the present invention, the entire screen of the terminal is divided into a main screen and a sub-screen, and the broadcast screen and the call screen are concurrently displayed on the main screen and the sub-screen, respectively. In this case, the terminal uses a picture in picture (PIP) scheme to display the broadcast screen and the call screen on the single display unit. The PIP scheme used for screen display is a screen display scheme in which the entire screen is divided into the main screen and the sub-screen and the sub-screen is relatively small as compared with the main screen. When the call service is used in a state in which the broadcast screen is displayed on the main screen, the sub-screen is generated on the terminal screen, such that two services can be concurrently viewed.

For example, when the call key is pressed in a state in which the broadcast screen is displayed on the main screen and the call screen is displayed on the sub-screen, the call screen is displayed in a large size on the main screen and concurrently the broadcast screen is displayed in a small size on the sub-screen. In contrast, when the broadcast key is pressed in a state in which the call screen is displayed on the main screen and the broadcast screen is displayed on the sub-screen, the broadcast screen is displayed in a large size on the main screen and concurrently the call screen is displayed in a small size on the sub-screen. A method for displaying the broadcast screen and the call screen to provide the concurrent service is not limited to the above description, but various modifications are possible.

The audio processor 150 is connected to a microphone (MIC) and a speaker (SPK). The audio processor 150 converts an audio signal transferred from the multimedia unit 140 and then outputs the converted signal through the speaker (SPK). The audio processor 150 converts an audio signal received from the microphone (MIC) into data and then transfers the data to the multimedia unit 140.

The key input unit 160 includes numeric keys and various types of function keys such as the call key and the broadcast key for service switching, and so on in accordance with the present invention. The key input unit 160 provides key input data to the controller 170.

The memory 180 stores information associated with the overall functions of the DMB terminal and simultaneously stores information associated with the broadcast service. Moreover, the memory 180 stores audio and video data generated from the parsing operation of the multimedia unit 140 under the control of the controller 170 in accordance with the embodiment of the present invention.

Under the control of the controller 170, the radio unit 190 transmits a radio frequency (RF) signal to a base station (BS) and receives an RF signal from the BS through an antenna (ANT).

The controller 170 processes and controls not only a conventional phone call, data communication, and wireless Internet access, but also various types of functions including a function for processing a screen between the broadcast service and the call service in the concurrent service time Concretely, the controller 170 controls the respective components such that the DMB is reproduced through the display unit 130 and the speaker. Moreover, the controller 170 controls the respective components for providing the concurrent service such that the call service can be used during the broadcast service.

When the user inputs a key for making a phone call request during the broadcast service, the controller 170 detects the input key, switches the broadcast screen to the call screen, and displays the call screen. Then, when a call attempt is made, the controller 170 detects the call attempt, performs a control operation for preventing an audio signal of the multimedia unit 140 from being output to the audio processor 160, and performs the call service in response to the call attempt. At this time, the controller 170 displays the call screen on the display unit 130 in a state in which a broadcast service connection is maintained. When a call request is input during the broadcast service mode, the controller 170 suspends the broadcast service mode, stops an output of an audio/video signal of the broadcast service mode, and outputs an audio/video signal of the requested call service mode.

In this state, the user can toggle and view the broadcast screen and the call service using the keypress. Because electric current consumption and heating problems may occur in a situation in which the concurrent service is continuously provided, a function capable of forcibly stopping the broadcast service after a predetermined time is elapsed can be implemented when a call continues for a long time.

When an incoming call is received during the broadcast service, the controller 170 detects the incoming call and displays a message of notification of the incoming call. The user can recognize the incoming call and determine a call connection. If the user inputs a key for the call connection, the controller 170 stops only an output of a broadcast audio signal in a state in which the broadcast service connection is maintained and controls broadcast sound to be processed as mute sound. Simultaneously, the controller 170 performs a control operation such that a call signal input from the radio unit 190 is processed and voice of the other side is output through the speaker. Whenever the call connection key is input, the controller 170 displays the call screen rather than the broadcast screen on the display unit 130. Then, when the call connection is stopped, the controller 170 controls a broadcast audio signal to again output and displays the broadcast screen of the broadcast service mode.

In accordance with another embodiment of the present invention, when the user desires to make a phone call while an audio/video signal of the broadcast service mode is output, the controller 170 detects that the user desires to make the phone call and superimposes and displays on the broadcast screen a window for inputting a called number. Then, the controller 170 generates an OSD signal according to the keypress when the called number is input, and superimposes and displays the OSD signal on a video signal of the broadcast service mode.

In this case, when the length of the called number exceeds the size of the input window, the slide scheme can be used such that the user easily views the input called number. Then, when the user presses the call key, the controller 170 stops only an output of an audio signal of the broadcast service mode and attempts a call connection to an associated called number. According to this call service mode, an OSD signal is generated. When the OSD signal is displayed in a state in which it is superimposed on the video signal, the OSD signal can be displayed as text data for notification of a call state and can be displayed in an upper or lower part of the broadcast screen on the basis of the slide scheme.

In other words, when the call key is pressed, the controller 170 stops an output of an audio signal of the broadcast service mode and then outputs an audio signal of the call service mode. Then, the controller 170 superimposes and displays on the broadcast screen of the broadcast service mode data of the call service mode.

When the call key is pressed, for example, according to a call service request, the controller 170 superimposes and displays data associated with a call connection operation while continuously outputting an audio/video signal of the broadcast service. If the call connection is established, the controller 170 stops the audio signal output of the broadcast service mode and then outputs an audio signal based on the call connection.

When an outgoing call is present while the DMB is being viewed in another embodiment of the present invention, only an output of a broadcast audio signal is stopped. In this case, the user can talk over the phone while viewing the broadcast screen and data of notification of a call state that is partially superimposed on the broadcast screen. It is possible without departing from the scope of the present invention that the user can talk over the phone while viewing the broadcast screen and a call state displayed according to the OSD scheme after an output of an broadcast audio signal is stopped, if an incoming call is present when DMB is watched and the call key is pressed for a call connection. Here, a detailed description of the controller 170 in the case where the incoming call is present while the broadcast is watched is omitted.

A process for providing the call service during the broadcast service in the terminal configured as stated above will now be described. In accordance with an embodiment of the present invention, there will be described a call service request during the broadcast service that is divided into two cases according to call reception/transmission.

Figure 3A:
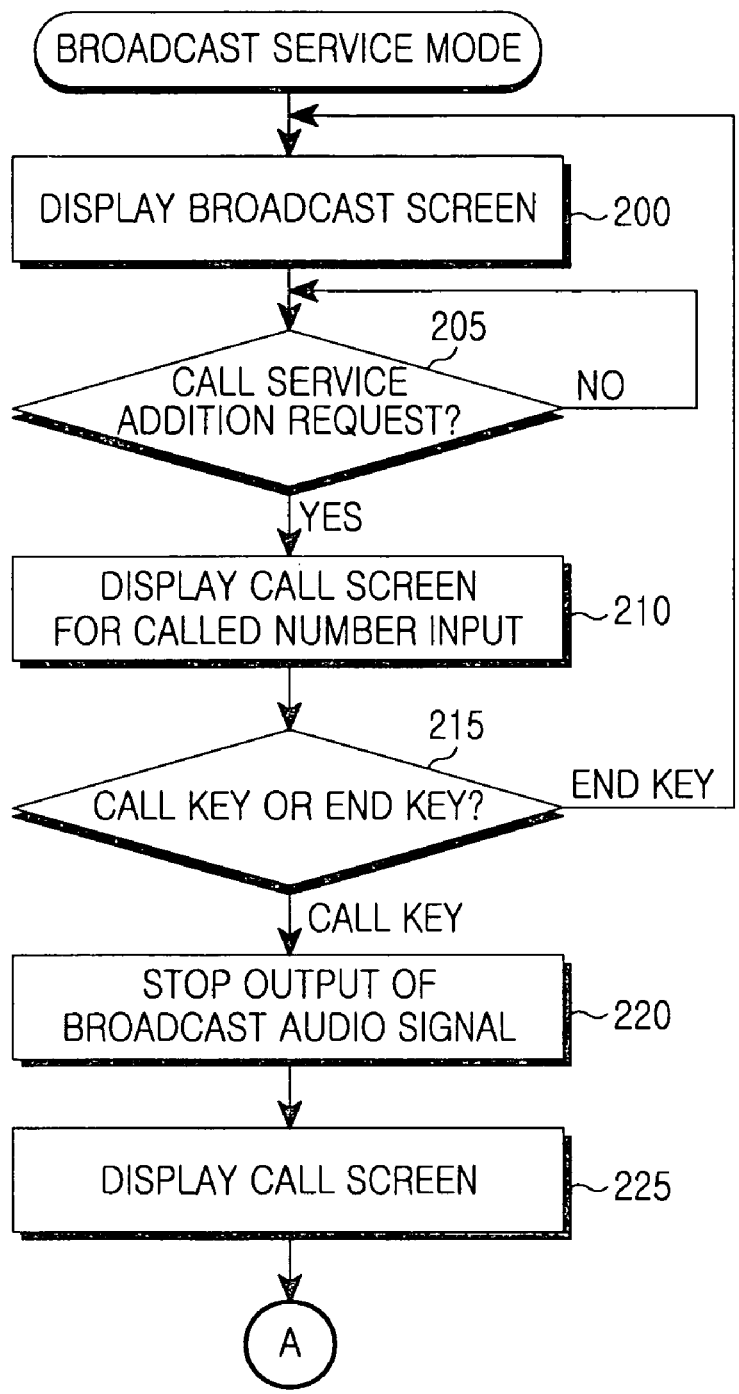
FIGS. 3A and 3B are flowcharts illustrating a call transmission operation in a broadcast service time in accordance with an embodiment of the present invention.
Figure 3B:
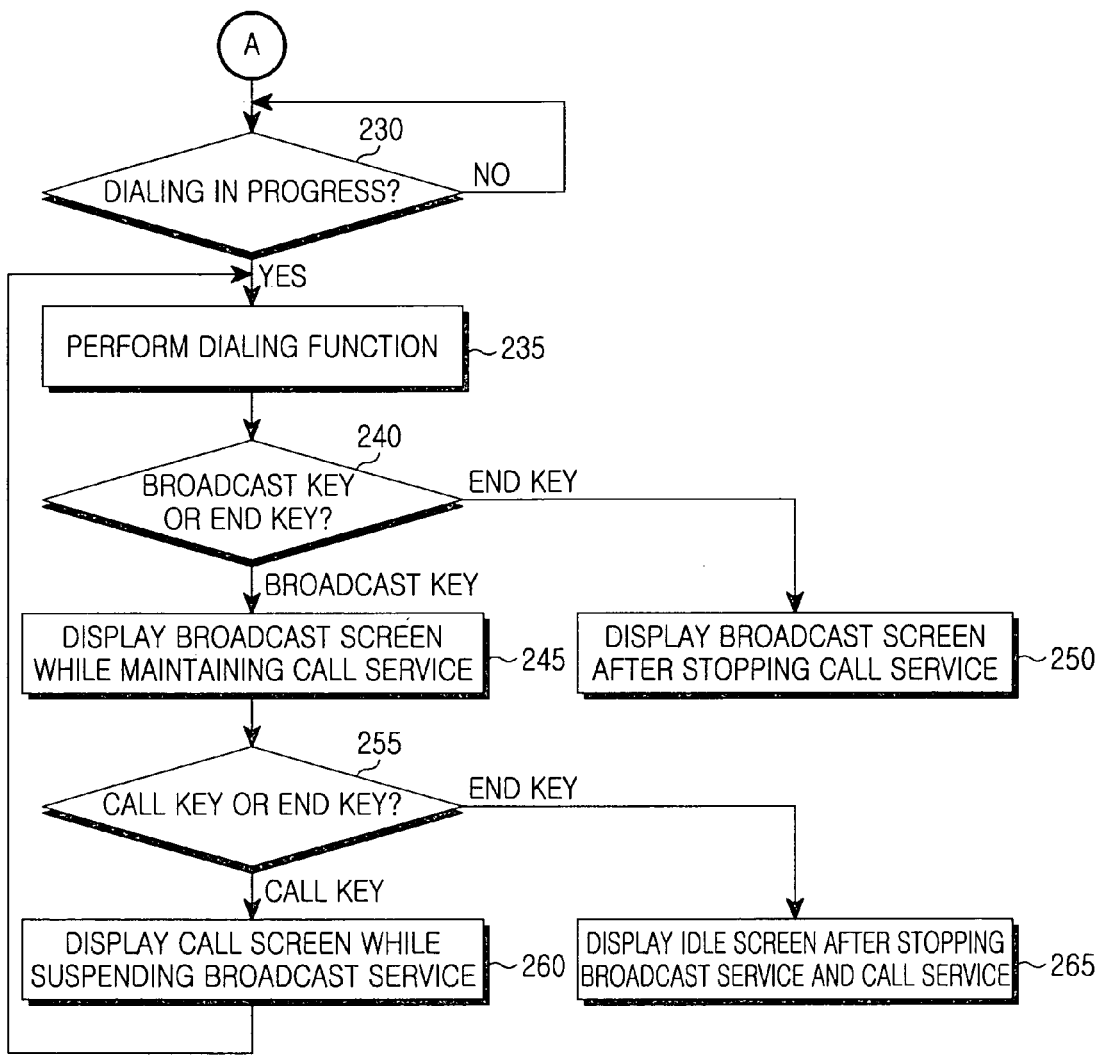

The case where the user makes a phone call during the broadcast service will be described in more detail with reference to FIGS. 3A and 3B. FIGS. 3A and 3B illustrate a process for transmitting a call during the broadcast service.

The operation of the DMB terminal will be described with reference to FIG. 3A. When the user sets the broadcast service mode using the broadcast key, the controller 170 displays a broadcast screen in step 200. In detail, when the broadcast service mode is set, the controller 170 controls a broadcasting signal received by the digital broadcasting receiver 110 to be output to the multimedia unit 140 through the demodulator 120. Then, the controller 170 performs a control operation such that an audio signal and a video signal generated from a parsing operation of the multimedia unit 140 are output to the audio processor 150 and the display unit 130, respectively.

Figure 4A:
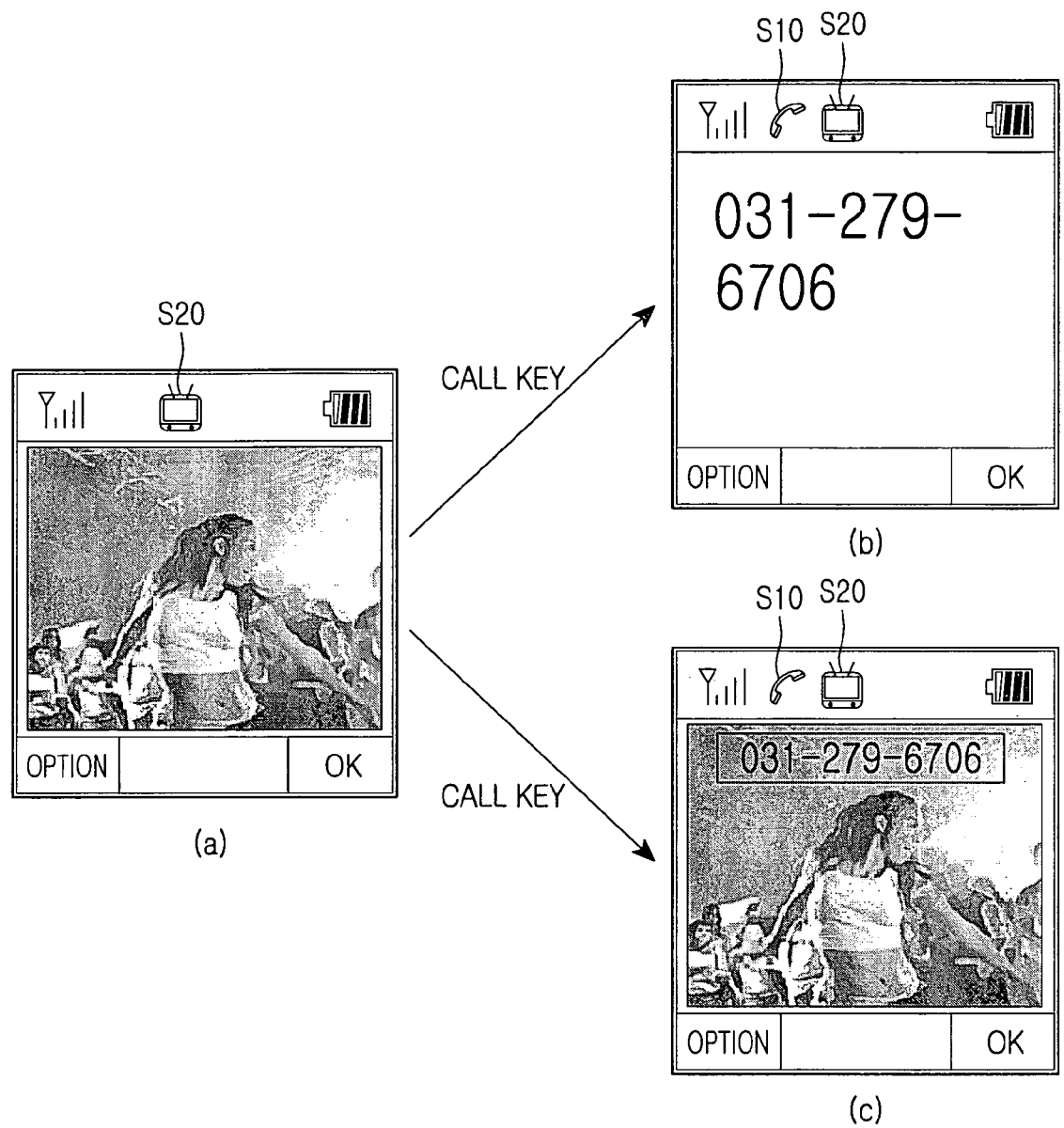
FIGS. 4A to 4C are exemplary screens illustrating FIGS. 3A and 3B in more detail.

The user can watch the DMB through the display unit 130 and listen to the audio through the speaker. In this case, an example of a screen for displaying the DMB is illustrated in FIG. 4A(a). The controller 170 determines if a call service addition request is present in step 205. In accordance with the present invention, the user can press a predetermined key, i.e., the call key, to make a phone call while watching a broadcast. When a key input is present according to the call service addition request in step 205, the controller 170 proceeds to step 210 to display a call screen as illustrated in FIG. 4A(b) such that a called number can be input. In accordance with another embodiment of the present invention, the controller 170 can display a pop-up window for inputting the called number as illustrated in FIG. 4A(c).

In this case, icons for indicating the current mode state can be displayed on an upper part of the terminal screen as indicated by reference numerals S10 and S20 such that the user can be notified of concurrent service mode in which the call service and the broadcast service are concurrently performed in accordance with an embodiment of the present invention. Even when the call screen is displayed on the main screen, the user can know that the broadcast service is continuously performed through the icon S20 of a television shape.

Figure 4B:
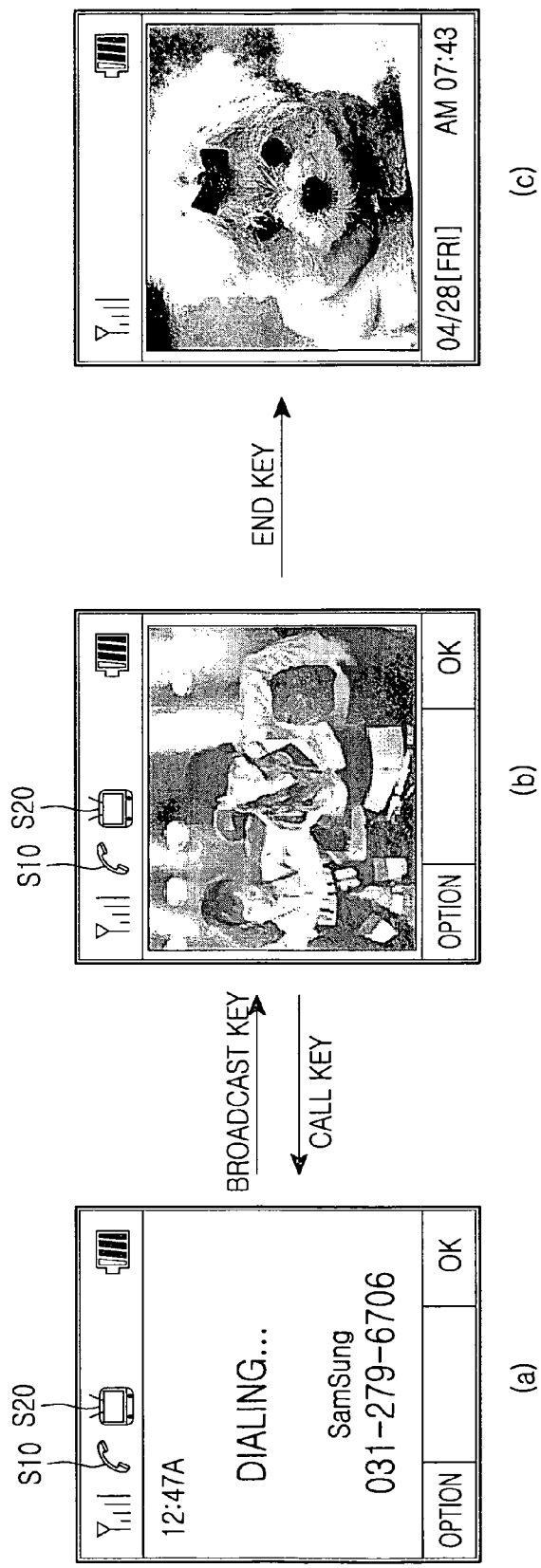

When the user inputs the called number, the controller 170 proceeds to step 215 to determine if the call key or the end key is input. If the call key is input, the controller 170 proceeds to step 220 to stop an output of a broadcast audio signal. Subsequently, the controller 170 displays the call screen indicating that a dialing operation is in progress as illustrated in FIG. 4B(a) in step 225. Simultaneously, the controller 170 outputs a ring back tone based on the dialing operation through the speaker. At this time, the call screen is displayed on the main screen and the broadcast is executed in background in a state in which it is not displayed. However, when the end key is input in a state in which the called number has been input in step 215, the controller 170 returns to step 200, switches the call screen to the broadcast screen, displays the broadcast screen as the main screen, and performs the full broadcast service mode. During the call attempt, the controller 170 re-enters the broadcast service mode when the end key is input or returns to the broadcast service mode when the cancel key is input.

Step 225 of FIG. 3A is followed by step 230 of the control flow of FIG. 3B. The symbols "A" indicate that step 225 of FIG. 3A is connected to step 230 of FIG. 3B.

In accordance with the present invention as described above, a broadcast audio signal is output only before the call transmission is performed when the user desires to use the call service during the broadcast service. Then, the call screen is displayed as the main screen and the call mode is performed. At this time, DMB sound is only processed as mute sound and the video broadcast is continuously executed. However, the terminal screen displays the call screen instead of the broadcast screen.

Figure 4C:
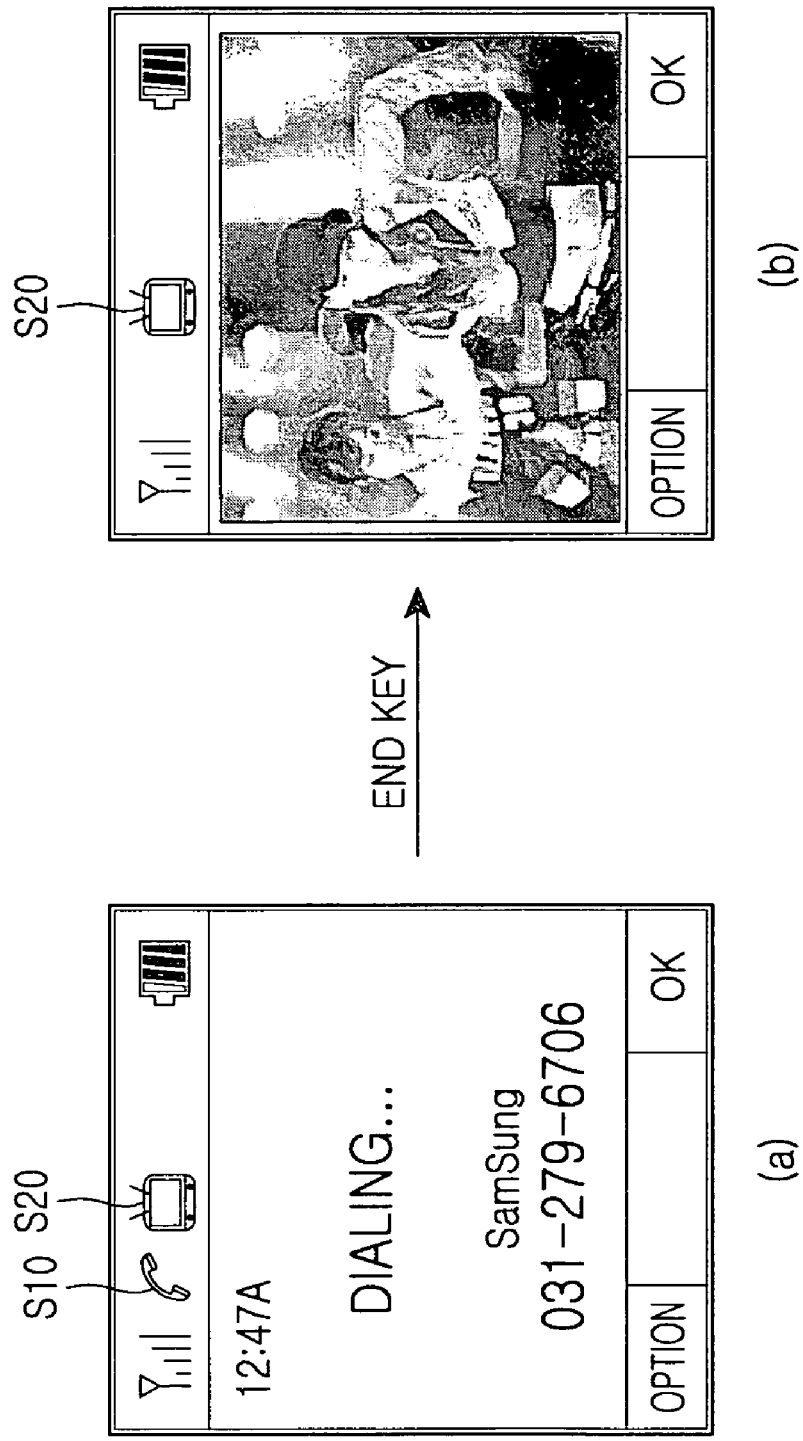

Then, the controller 170 proceeds to step 230 of FIG. 3B and determines if dialing to the called number is in progress. If the dialing operation is in progress as a result of the determination, the controller 170 proceeds to step 235 to perform the conventional dialing function. That is, the broadcast service is continuously connected, but only the icon of the television shape indicating that the broadcast service is in progress is displayed on the actual screen. As illustrated in FIG. 4B(a), the call screen for indicating that the dialing operation is in progress is displayed. In this state, the controller 170 proceeds to step 240 to determine if the broadcast key or the end key is input while the dialing function is performed. If the broadcast key is input as a result of the determination, the controller 170 proceeds to step 245 to display the broadcast screen while maintaining the call service for the dialing operation as illustrated in FIG. 4B(b). That is, the user can view the broadcast through the screen and simultaneously can listen to the ring back tone through the speaker. In contrast, if the end key is input in step 240, the controller 170 stops the call service while stopping the dialing operation and displays the broadcast screen in step 250. For example, when a predetermined key for canceling the dialing operation in progress is input as illustrated in FIG. 4C(a), the controller 170 stops the call service, deletes an icon of a phone handset shape in order to notify the user that only the broadcast service is provided, and simultaneously displays the broadcast screen as illustrated in FIG. 4C(b).

When the broadcast screen is displayed while the concurrent service is performed as illustrated in FIG. 4B(b) in step 245, the controller 170 proceeds to step 255 to determine if the call key or the end key is input. If the call key is input as a result of the determination, the controller 170 proceeds to step 260 to display the call screen while suspending the broadcast service. In contrast, if the end key is input, the controller 170 proceeds to step 265 in which an idle screen as illustrated in FIG. 4B(c) is displayed and the idle mode is performed after both the broadcast service and the call service are stopped. That is, when the broadcast is watched while the dialing operation is in progress, the input end key is a means for returning to the idle state. While the broadcast is watched as illustrated in FIG. 4B(b), the input broadcast key can be used as a means for changing a channel according to a key input.

Figure 5:
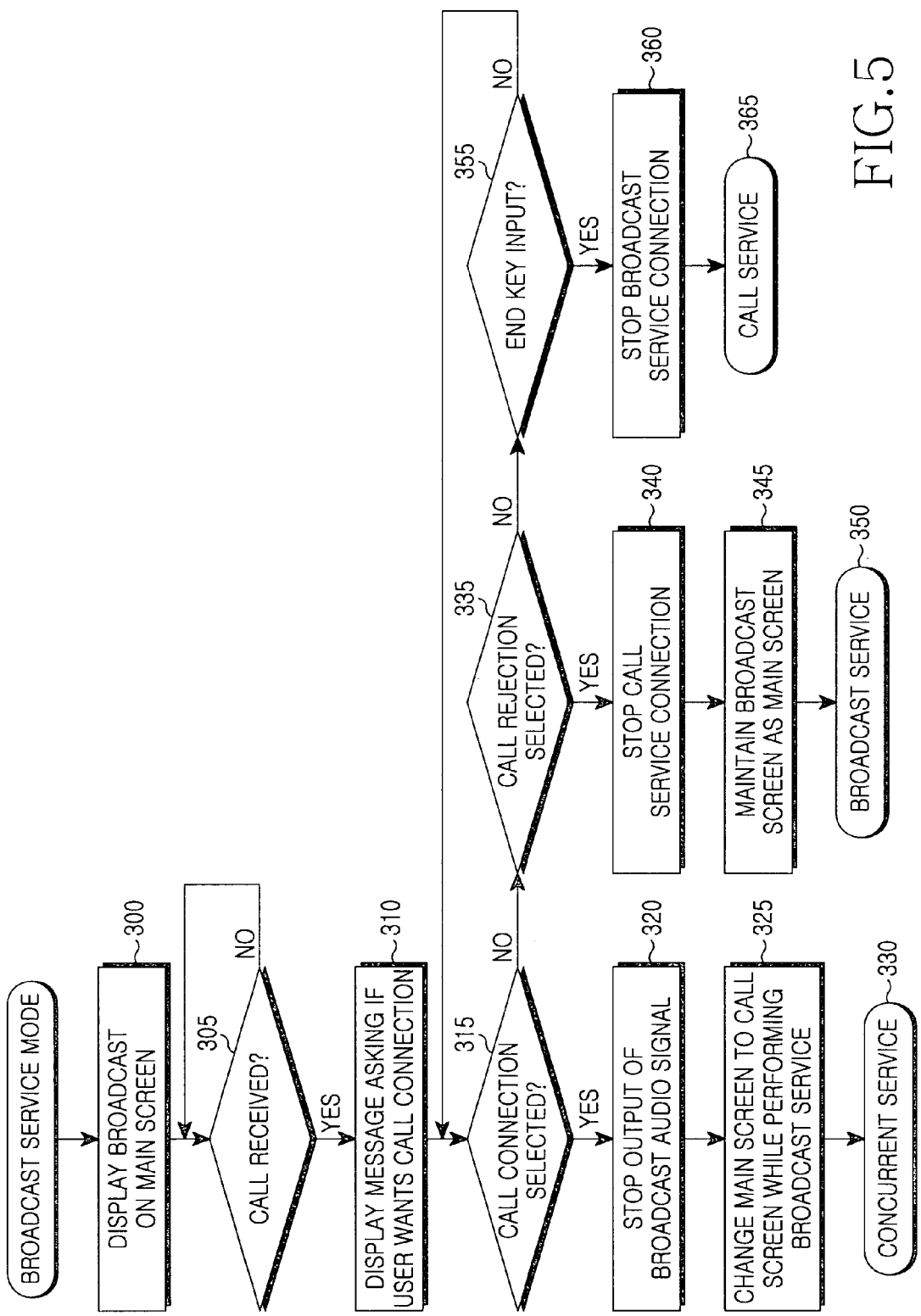
FIG. 5 is a flowchart illustrating a call reception operation in a broadcast service time in accordance with an embodiment of the present invention.

The case where the user desires to receive an incoming call during the broadcast service will be described with reference the flowchart of FIG. 5.

Figure 6A:
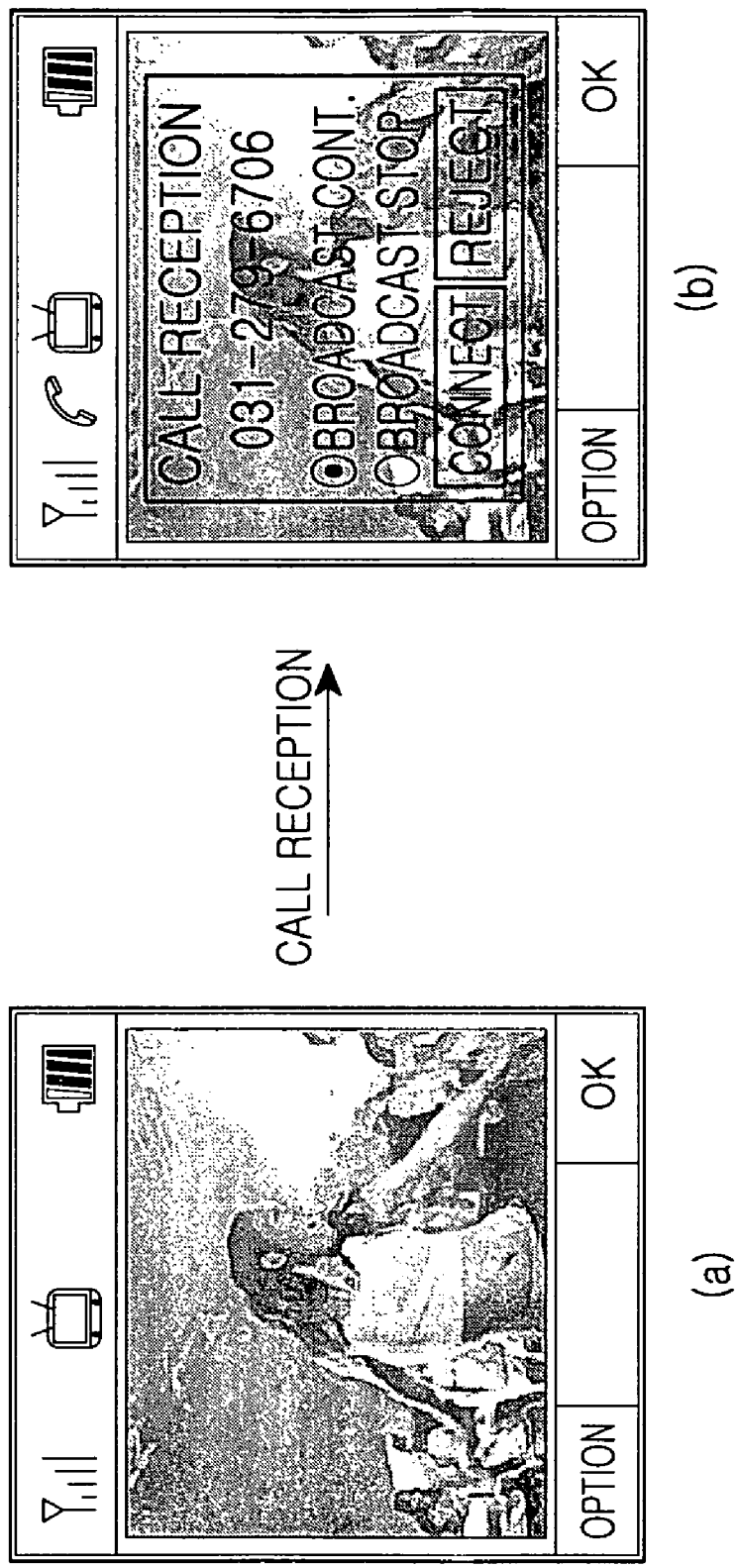
FIGS. 6A to 6D are exemplary screens illustrating FIG. 5 in more detail.

The operation of the DMB receiving terminal according to call reception in the broadcast service time will be described. When the user sets the broadcast service mode through the broadcast key, the controller 170 displays a broadcast on the main screen as illustrated in FIG. 6A(a) in step 300. Then, the controller 170 proceeds to step 305 to determine if an incoming call is received. If the incoming call is present, the controller 170 proceeds to step 310 to display a message asking if the user wants a call connection in response to the incoming call in the form of a pop-up window as illustrated in FIG. 6A(b). The user can identify the call reception through the pop-up window and determine a call connection or rejection in accordance with an embodiment of the present invention. Additionally, the user can select to determine whether the call connection in a state in which the broadcast currently being watched is continuously maintained or in a state in which the broadcast is stopped.

In the following description, it is assumed that the user has made the selection for continuously maintaining the broadcast for the concurrent service to which the present invention is applied. Then, the controller 170 determines if call connection selection from the user is input in a state in which the broadcast is continuously maintained in step 315. At this time, the call connection selection can be achieved by pressing the call key.

Figure 6B:
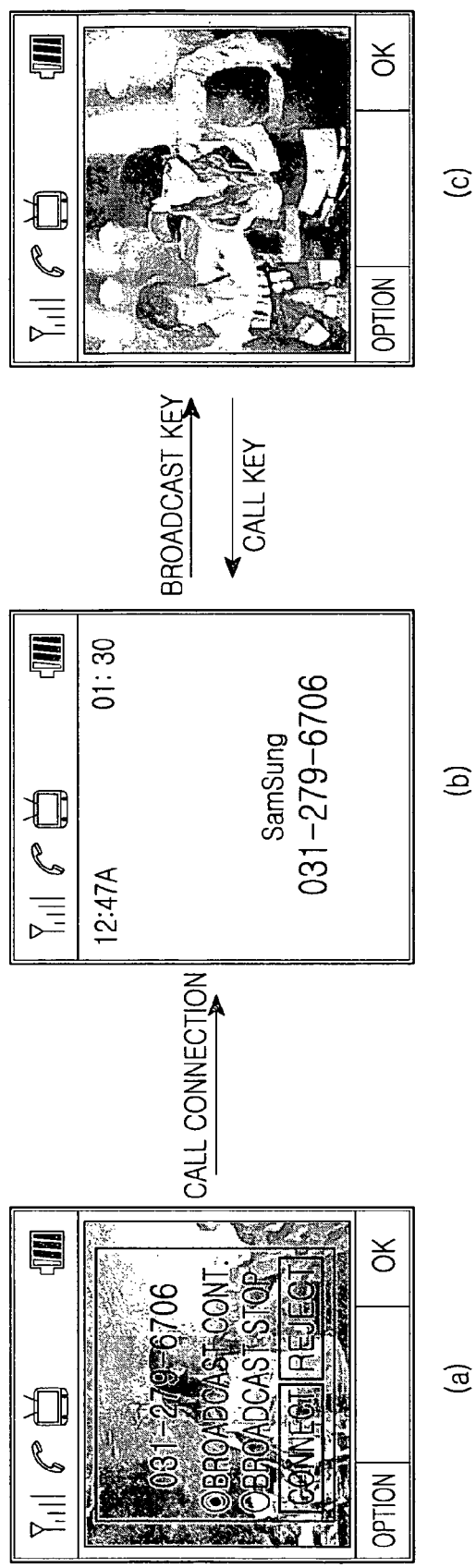

When the call connection is selected in a state as illustrated in FIG. 6B(a), the controller 170 proceeds to step 320 to stop an output of a broadcast audio signal. Then, the controller 170 executes the broadcast service in the background, changes the main screen to the call screen, and displays the call screen as illustrated in FIG. 6B(b). The controller 170 performs a call function in a state in which the call screen is displayed, and performs the concurrent service for continuously executing the broadcast service in the background in step 330. When the broadcast key is input in a state in which the main screen is the call screen during the concurrent service as illustrated in FIG. 6B(b), the controller 170 switches the call screen to the broadcast screen and displays the broadcast screen as illustrated in FIG. 6B(c). In contrast, when the call key is input in a state in which the main screen is the broadcast screen during the concurrent service as illustrated in FIG. 6B(c), the controller 170 switches the broadcast screen to the call screen and displays the call screen as illustrated in FIG. 6B(b).

Figure 6C:
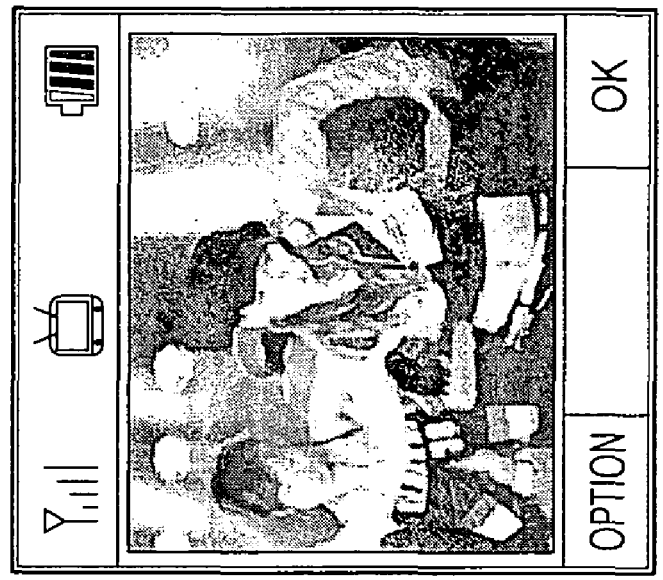
Figure 6C:
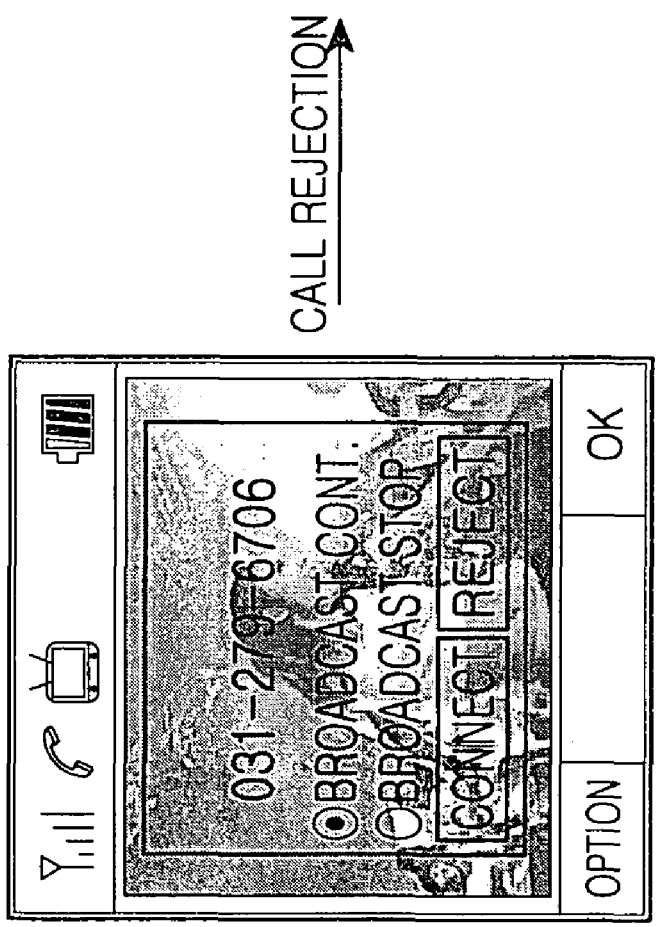

When the call connection is not selected in step 315, the controller 170 proceeds to step 355. At this time, the user can select the call rejection by inputting the cancel key or moving the screen focus to the call rejection. Accordingly, when the call rejection is selected as in a state as illustrated in FIG. 6C(a), the controller 170 proceeds to step 340 to stop a call service connection. Then, the controller 170 proceeds to step 345 to remove the pop-up window and maintain the broadcast screen as the main screen. Accordingly, the controller 170 performs only the broadcast service in step 350.

When the call service connection is stopped, the user terminal performs an associated operation according to the call service connection stop such as an operation for sending a call rejection signal to an opposite terminal through a base station. For example, a voice message indicating that the call connection will not be established can be output in the opposite terminal.

Figure 6D:
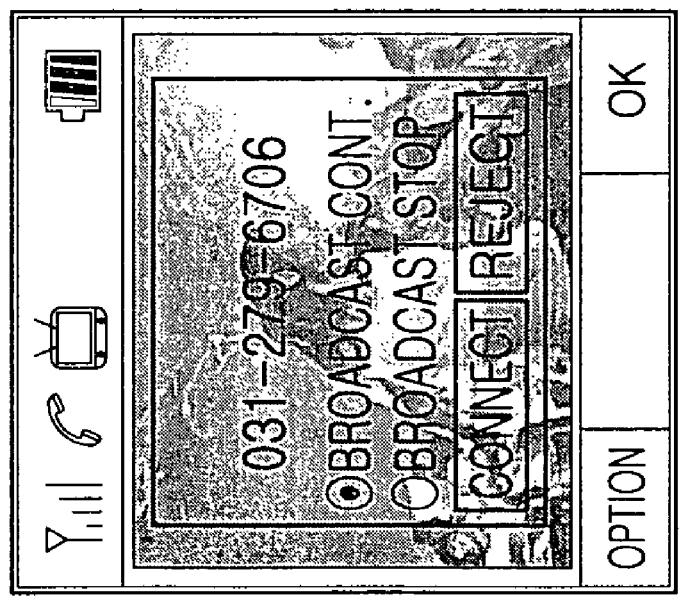
Figure 6D:
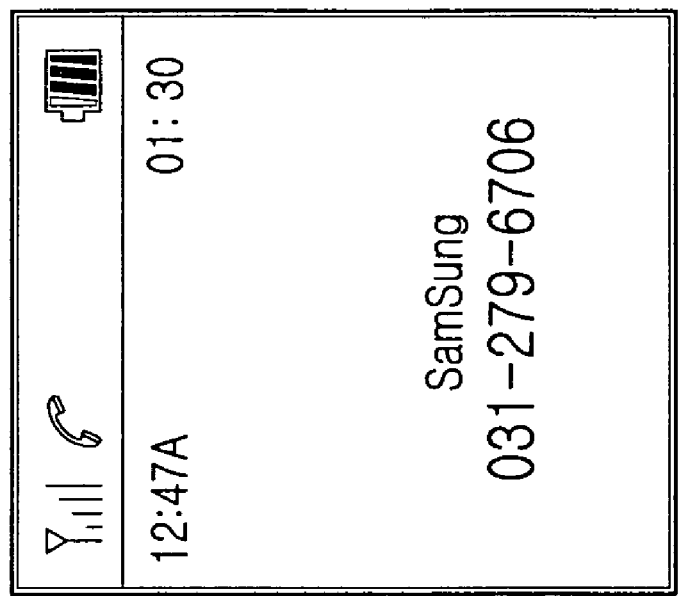

On the other hand, when an input key is not a key input for the call connection or rejection, the controller 170 proceeds to step 355 to determine if the end key is input. If the end key is input as in the state as illustrated in FIG. 6D(a), the controller 170 proceeds to step 360 to stop the broadcast service connection. Then, the controller 170 performs the call service in step 365. Accordingly, the screen as illustrated in FIG. 6D(b) can be displayed in which the broadcast is stopped and only the call service is performed.

Figure 7:
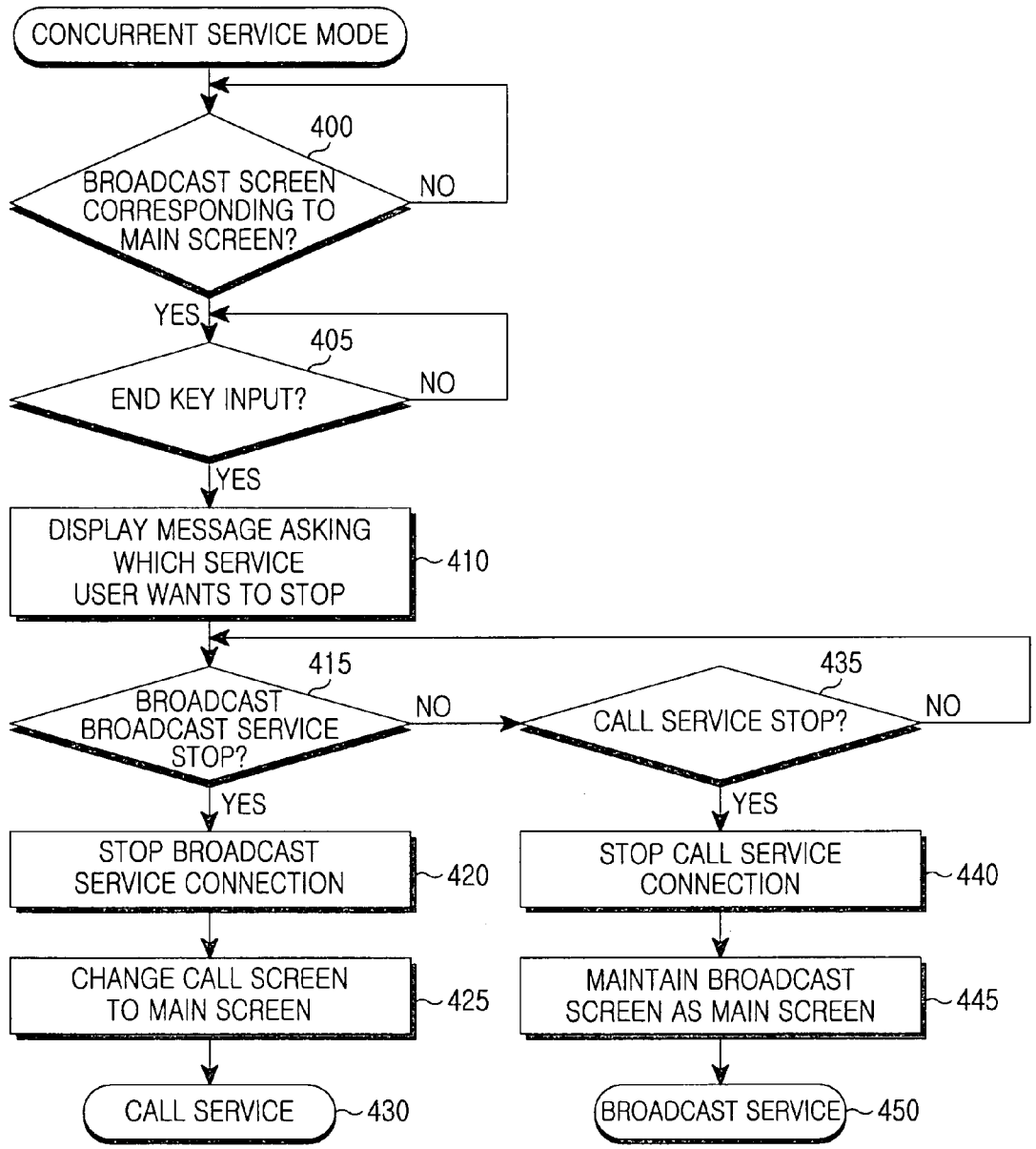
FIG. 7 is a flowchart illustrating a process for stopping a call service in a concurrent service time in accordance with an embodiment of the present invention.

A process for stopping the call service connection while the broadcast service and the call service are provided will be described. A process for stopping the call service during the concurrent service in accordance with the present invention will be described with reference to FIG. 7.

Figure 8A:
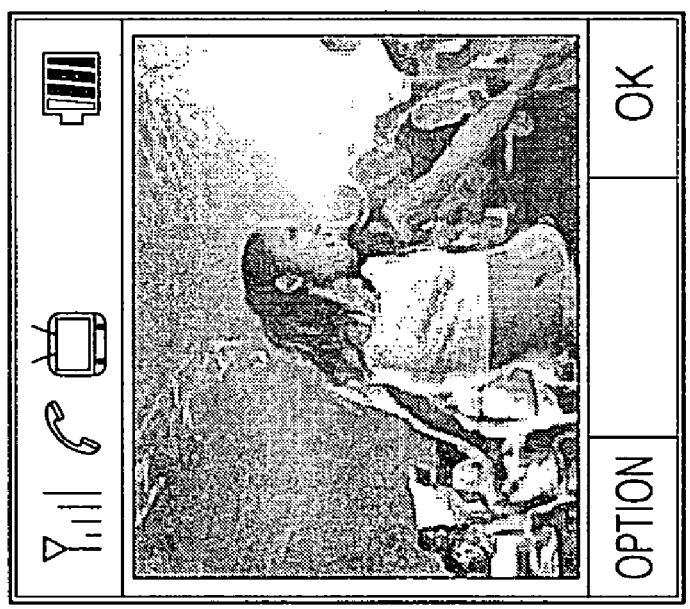
FIGS. 8A to 8C are exemplary screens illustrating FIG. 7 in more detail.
Figure 8A:
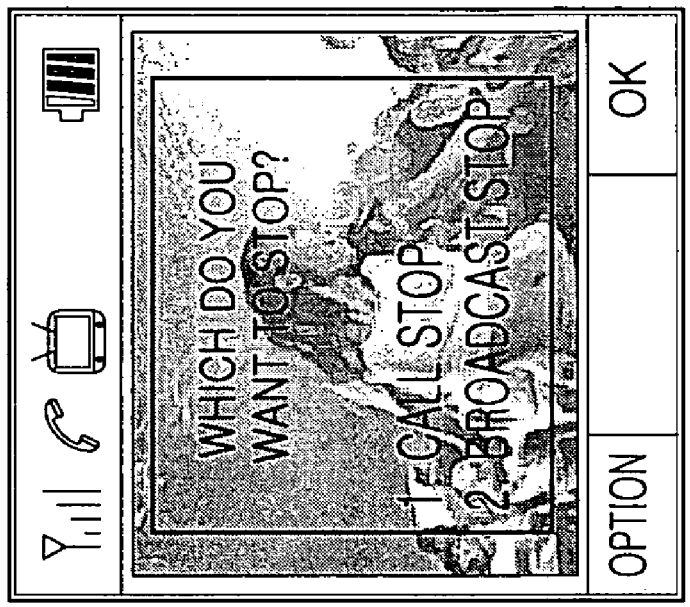

First, the controller 170 determines if the current main screen is the broadcast screen while the concurrent service is performed in step 400. If the current state is the call state and simultaneously the broadcast is displayed on the screen as illustrated in FIG. 8A(a), the controller 170 proceeds to step 405 to determine if the end key is input. If the end key is input, the controller 170 proceeds to step 410 to display a message asking which service the user wants to stop in the concurrent service in the form of a pop-up window as illustrated in FIG. 8A(b). It is preferred that the call service is immediately stopped when the call screen is the main screen in the concurrent service and the end key is input. However, it is preferred that a message asking which service the user wants to stop is displayed as illustrated in FIG. 8A(b) when the broadcast screen is the main screen.

Figure 8B:
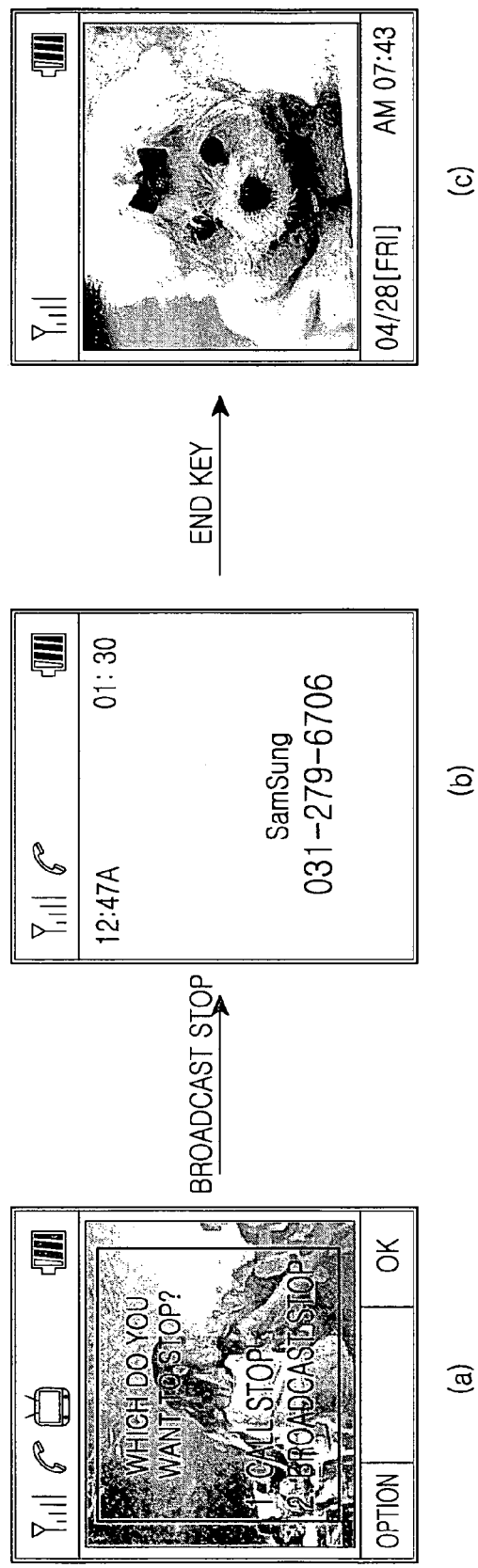

After asking which service the user wants to stop as illustrated in FIG. 8A(b), the controller 170 proceeds to step 415 to determine if the user selects broadcast service stop. If the user selects the broadcast service stop as a result of the determination, the controller 170 proceeds to step 420 to stop the broadcast service connection. Then, the controller 170 proceeds to step 425 to change the main screen to the call screen. Then, the controller 170 performs only the call service in step 430. That is, when the user selects the broadcast stop in the state as illustrated in FIG. 8B(a), the call screen as illustrated in FIG. 8B(b) is displayed and the broadcast service is stopped. When the end key is input once more in a state in which only the call service is provided, the controller 170 returns to the idle state after stopping the call service and displays the idle screen as illustrated in FIG. 8B(c).

Figure 8C:
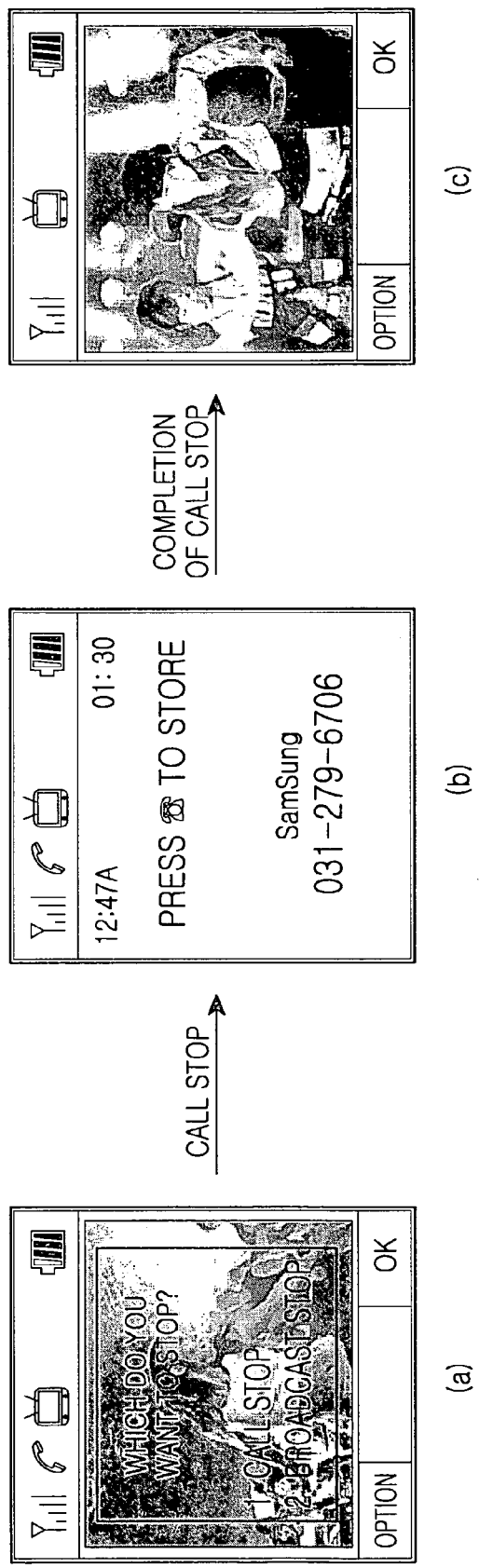

However, if the user does not select the broadcast service stop in step 415, the controller 170 proceeds to step 435 to determine if the call service stop is selected. If the call service stop is selected as a result of the determination, the controller 170 proceeds to step 440 to stop the call service connection. Then, the controller 170 maintains the broadcast screen as the main screen in step 445 and performs only the broadcast service in step 450. When the call stop is selected in the state as illustrated in FIG. 8C(a), the controller 170 displays a call stop screen as illustrated in FIG. 8C(b), enters the broadcast service mode at a call stop completion time-point, and displays a broadcast along with an output of a broadcast audio signal as illustrated in FIG. 8C(c). At this time, an operation for returning from the call stop screen of FIG. 8C(b) to the broadcast screen is performed after several seconds without an input of a special key.

Figure 9A:
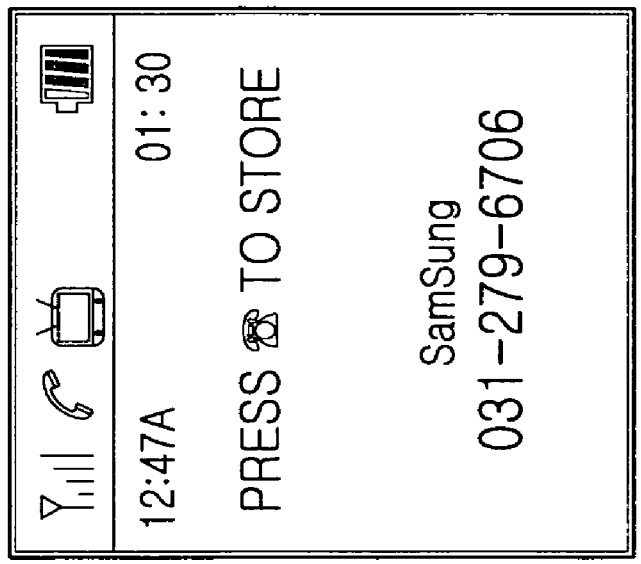
FIGS. 9A and 9B illustrate exemplary screens in the case where the other side stops a call in the concurrent service time in accordance with an embodiment of the present invention.
Figure 9A:
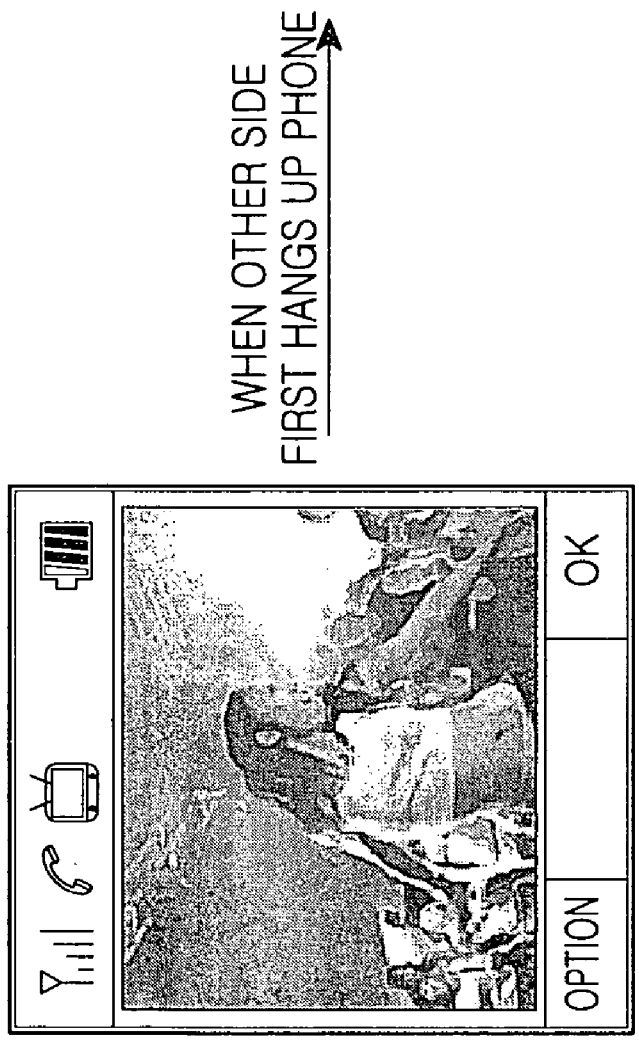
Figure 9B:
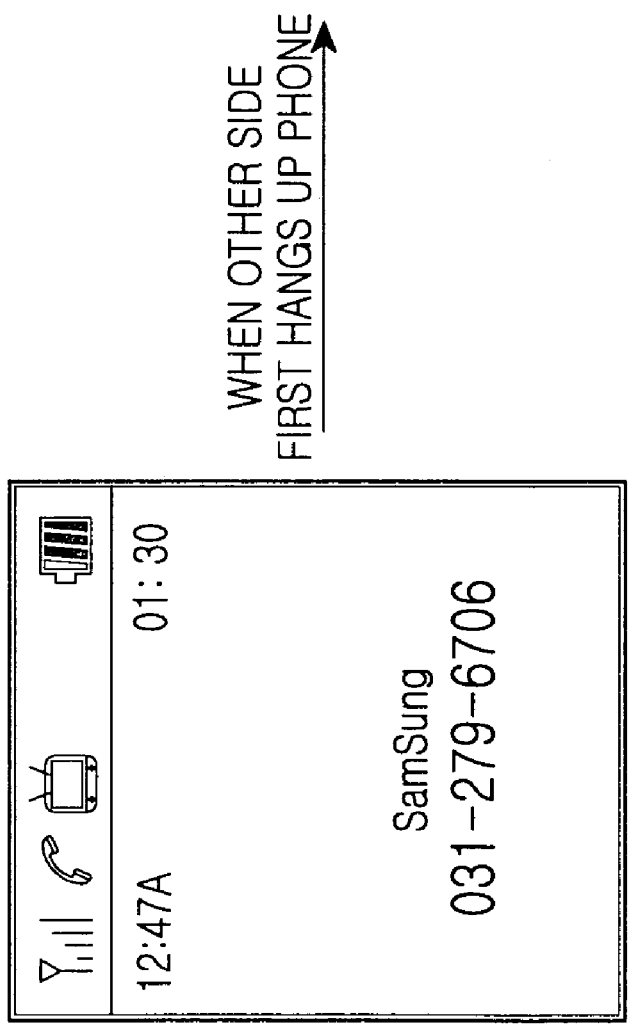

The example in which the user stops the call service by directly pressing the end key during the concurrent service has been described, but the call service can be stopped by the other side. For example, while the concurrent service is performed in a state in which the broadcast screen is displayed as illustrated in FIG. 9A(a), the other side may first hang up the phone. When the other side first hangs up the phone, a call stop request signal is received from the other side. Accordingly, the controller 170 displays a call stop screen as illustrated in FIG. 9A(b), and the broadcast screen is again displayed after several seconds. While the concurrent service is performed in a state in which the call screen is displayed as illustrated in FIG. 9B(a), the screen as illustrated in FIG. 9B(b) can be displayed when the other side hangs up the phone.

The example in which the concurrent service is performed in a state in which a 1:1 call connection is established during the broadcast service has been described. Of course, the concurrent service can be performed in a state in which a conference call connection is established between the user and at least one other person.

Figure 10A:
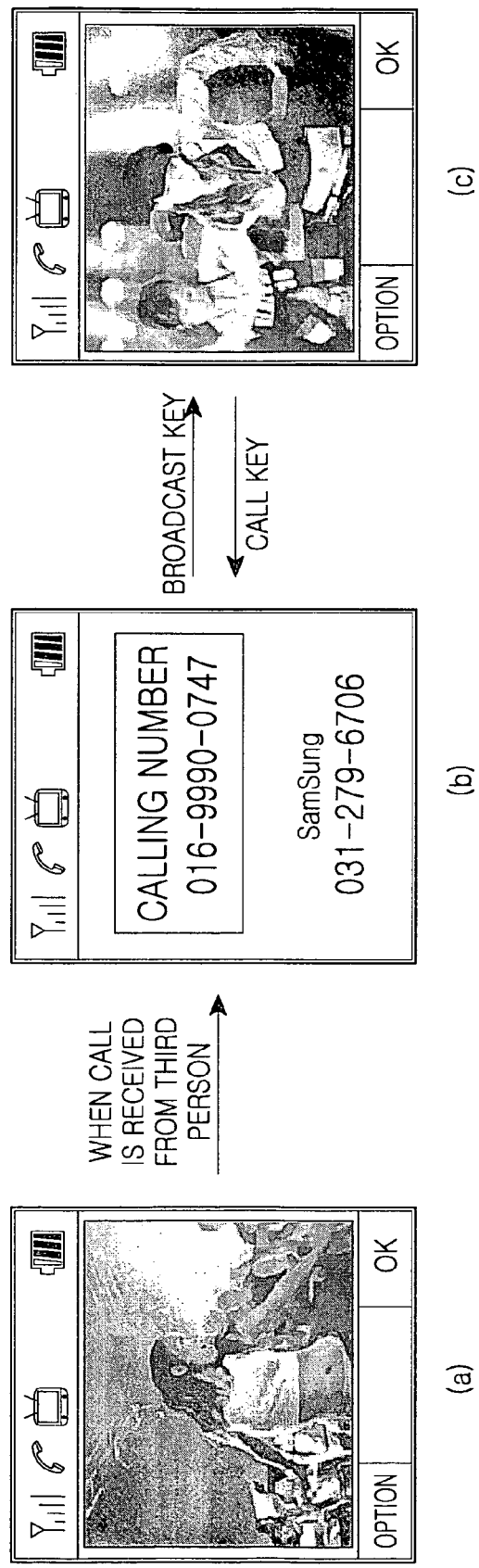
FIGS. 10A and 10B illustrate exemplary screens in the case where a conference call service is provided in the concurrent service time in accordance with an embodiment of the present invention.

For example, when a call received from the third person is present while the concurrent service is performed in a state in which the broadcast screen is displayed as illustrated in FIG. 10A(a), the controller 170 can display a message for notification of call reception from the third person in the form of a pop-up window as illustrated in FIG. 10A(b). Upon receiving the call, the user can establish a call connection with the third person without inputting a special call key such that a conference call service is possible. Alternatively, the system may be implemented such that the user determines whether to receive the phone call from the third person through a pop-up window. FIG. 10A(b) illustrates a case where a call related application is immediately executed when the call is received from the third person such that a call process such as call switching or call forwarding can be performed.

Figure 10B:
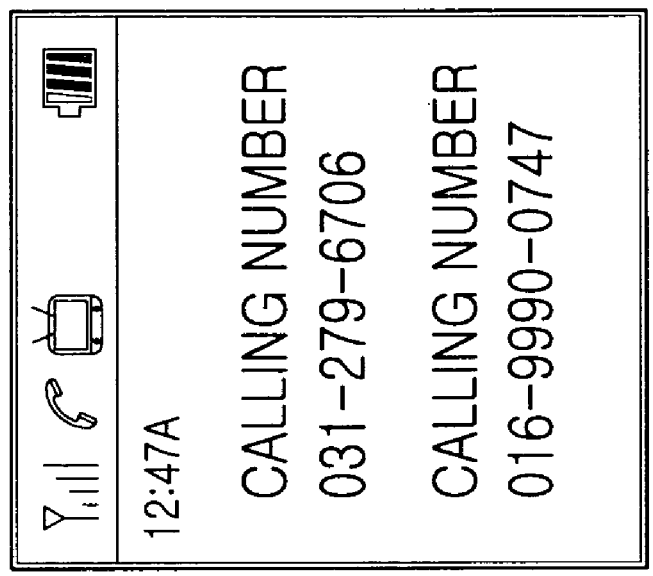
Figure 10B:
Figure 10B:
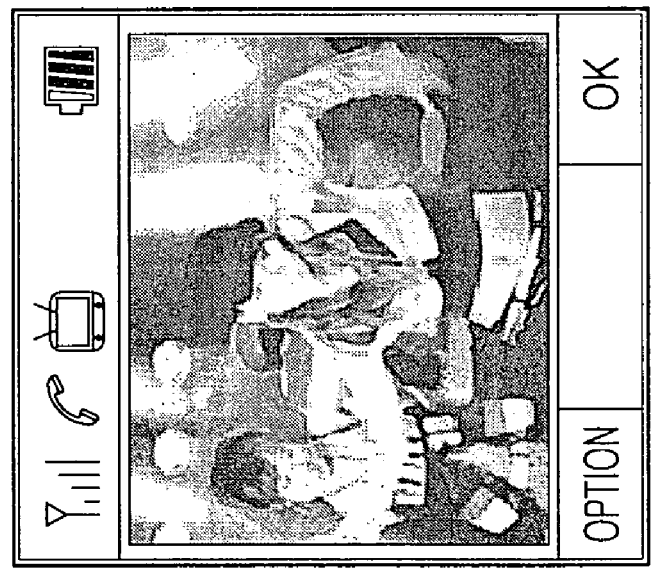

When the user presses the broadcast key also in a state in which a call screen for providing the conference call service is displayed, the broadcast can be continuously viewed in a mute state as illustrated in FIG. 10A(c). In a state in which the conference call service and the broadcast service are performed, screen switching between the respective services can be achieved through the broadcast key and the call key as described above. In contrast, when a call received from the third person is present while the concurrent service is performed in a state in which the broadcast screen is displayed as illustrated in FIG. 10B(a), the controller 170 can display information about other persons connected to the current call as illustrated in FIG. 10B(b).

In accordance with the present invention as described above, the user can select the move between service modes using the dedicated key set according to each application. Accordingly, the broadcast key input during the concurrent service is used to move from the call service mode for displaying the call screen to the broadcast service mode for displaying the broadcast screen. Similarly, the call key is used to move from the broadcast service mode to the call service mode.

There has been described the example in which the broadcast service and the call service are concurrently used according to switching between the broadcast screen and the call screen when the call service is used while the DMB is watched as described above. Alternatively, broadcast data and call data may be displayed together on one screen.

When the call service is used while the DMB is being viewed in another embodiment of the present invention, an OSD scheme is used to superimpose a video signal of the broadcast service mode and an OSD signal of the call service mode and output a result of the superimposition on the screen, without switching the broadcast screen currently being watched to the call screen.

In the above description, there has been described the case where the called number input by the user in a call transmission time is displayed on a partial display screen of the display unit 130 in the form of a pop-up window as illustrated in FIG. 4A(c) or is displayed in the form of the call screen as illustrated in FIG. 4A(b). Here, it can be found that the display screen of FIG. 4A(c) is switched to the display screen of FIG. 4A(b) according to the user's selection when the user selects the call connection. This case will be described below.

Figure 11:
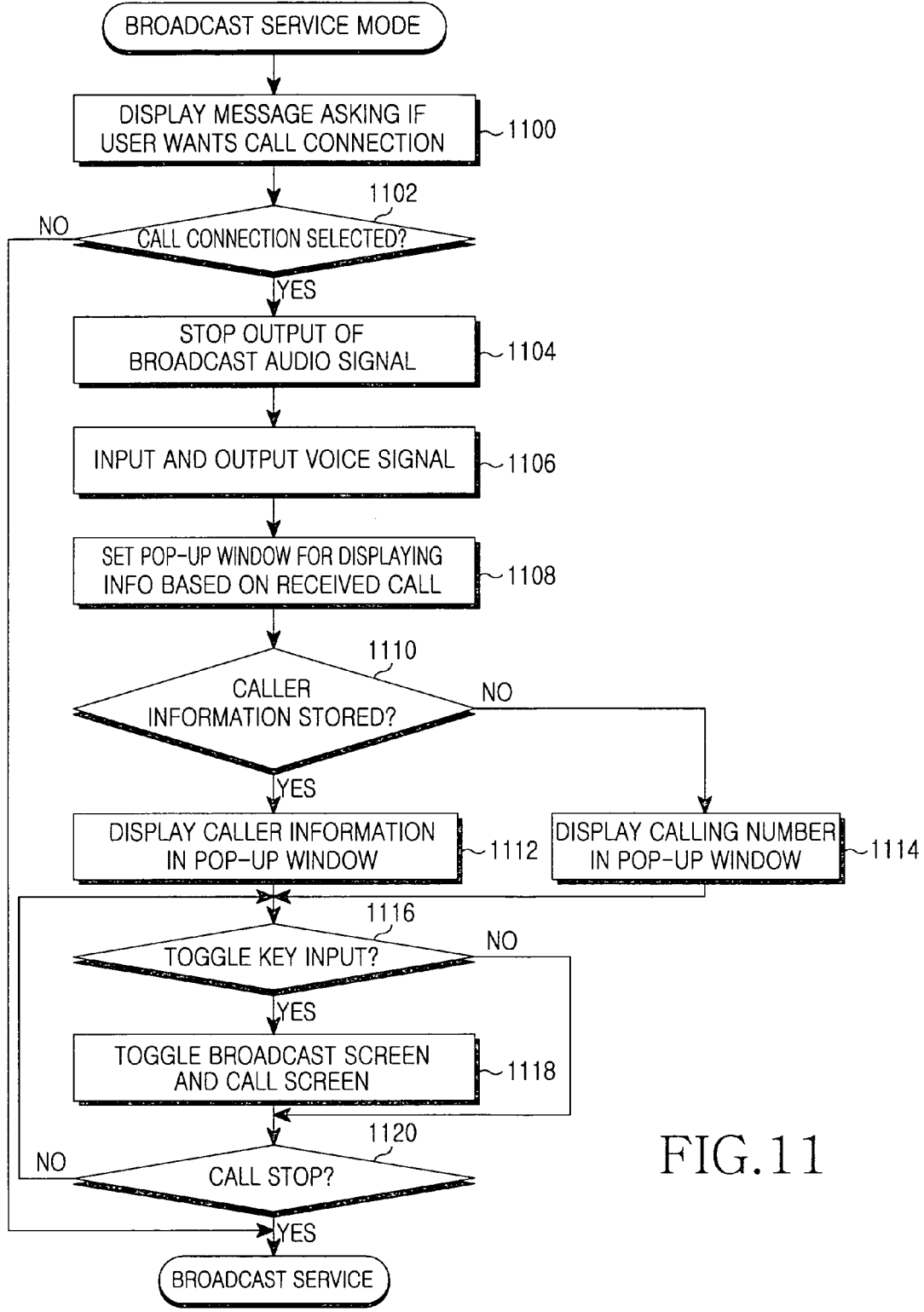
FIG. 11 is a flowchart illustrating a call reception operation in a broadcast service time in accordance with another embodiment of the present invention.
Figure 12:
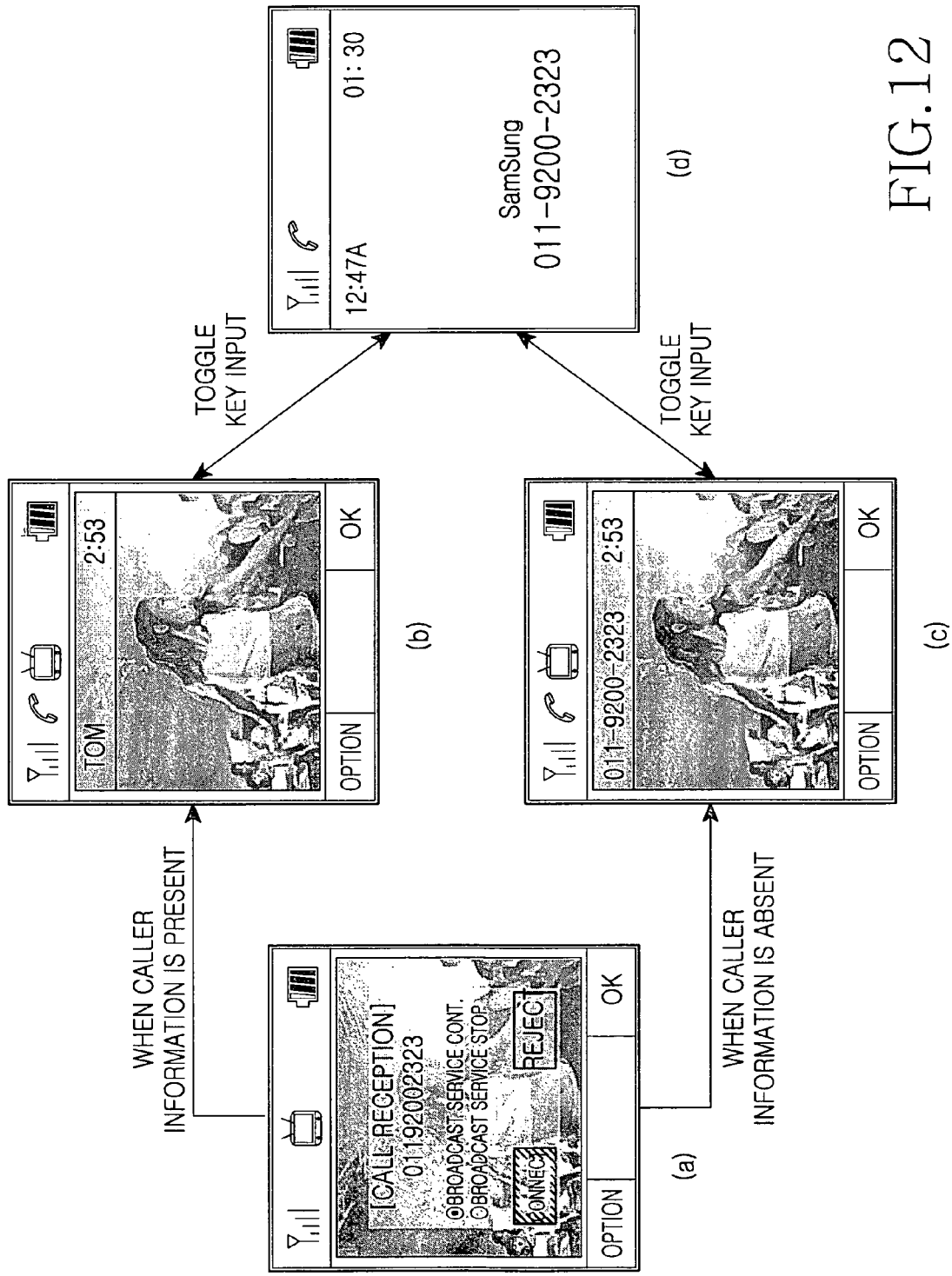
FIG. 12 illustrates exemplary screens in the case where caller information is displayed in the concurrent service time in accordance with an embodiment of the present invention.

FIG. 11 is a flowchart illustrating a call reception operation in the broadcast service time in accordance with another embodiment of the present invention, and FIG. 12 illustrates exemplary screens in the case where caller information is displayed during the concurrent service in accordance with an embodiment of the present invention. First, referring to FIG. 11, the controller 170 of the DMB terminal proceeds to step 1100 to display a message asking if the user wants a call connection, when a call is received in the broadcast service mode in which the broadcast screen is displayed as the main screen. In this case, an example in which the message asking if the user wants the call connection according to the call reception is displayed in the form of a pop-up window is illustrated in FIG. 12(a). Accordingly, the user can identify phone call reception and determine whether to perform a call connection or rejection. Alternatively, the user may select to determine whether the call connection in a state in which the broadcast currently being watched is continuously maintained or in a state in which the broadcast is stopped, through a pop-up window.

In the following description, it is assumed that the user has made selection for continuously maintaining the broadcast for the concurrent service to which the present invention is applied. The controller 170 of the DMB terminal determines if call connection selection from the user is input in a state in which the broadcast is continuously maintained in step 1102. At this time, the call connection selection of the user corresponds to the case where the concurrent service is performed.

When the user selects the call connection in step 1102, the controller 170 proceeds to step 1104 to stop an output of a broadcast audio signal. Then, the controller 170 proceeds to step 1106 to perform the concurrent service in the above-described scheme and input and output a voice signal according to the call reception. Then, the controller 170 proceeds to step 1108 to set an area for displaying a pop-up window in order to display call reception information. Then, the controller 170 proceeds to step 1110 to determine if caller information mapped to a calling number according to the received call is stored. If the caller information mapped to the calling number is stored in step 1110, the controller 170 proceeds to step 1112 to display the caller information on the pop-up area set in step 1108. Of course, the current call duration time as well as the caller information can be displayed. A pop-up window for displaying the caller information and the call duration time is referred to as a call notification window.

FIG. 12(b) illustrates an example of a screen for displaying the caller information and the call duration time when pre-stored caller information is present. That is, when the calling number according to the call reception is pre-stored, the caller information, i.e., a caller name and the call duration time, is included and displayed in the call notification window as illustrated in FIG. 12(b). Here, the call notification window may be a Snooze pop-up window that continuously appears while the user talks over the phone according to the user's selection.

However, if the caller information mapped to the calling number according to the call reception is not pre-stored as a result of the determination of the controller 170 in step 1110, the call notification window displays the calling number according to the call reception, i.e., the callback number, instead of the caller information. An example of this case is illustrated in FIG. 12(c). This is an example of a screen for displaying the callback number and call duration time information of the user instead of the caller information.

Accordingly, the controller 170 displays the caller information in the call notification window of the display unit 130 in step 1112 or displays the calling number in the call notification window in step 1114 according to a result of the determination in step 1110. In another embodiment of the present invention, the main screen can be switched to the call screen as illustrated in FIG. 4A(b) according to the user's selection. For this, the controller 170 proceeds to step 1116 to determine if a toggle key is input from the user.

When the toggle key is input in step 1116, the controller 170 proceeds to step 1118 to toggle the current output screen. For example, when the user inputs the toggle key in a state in which the broadcast screen is currently displayed, it is switched to the call screen. When the user inputs the toggle key in a state in which the call screen is currently displayed, it is switched to the broadcast screen. Then, the controller 170 proceeds to step 1120 to determine if the user has stopped the call. If the user has stopped the call, the call service mode according to the concurrent service is stopped and the broadcast service mode is performed. The user can switch the main screen from the broadcast service screen on which the call notification window is displayed to the call screen by inputting the toggle key, for example, the call key. In this case, the user can perform switching to the screen on which the call notification window is displayed by inputting the toggle key once more.

FIGS. 12(b), 12(c), and 12(d) illustrate an example of switching a screen in accordance with another embodiment of the present invention. When a call is received in the broadcast service time, the caller information and the call duration time information according to the call reception are displayed on the call notification window according to the user's selection. The broadcast screen including the call notification window in which the calling number is displayed is switched to the call screen according to the user's selection. During the concurrent service in which the main screen is the broadcast service screen, the user can find that he or she is currently engaged in a call.

The example of one toggle key has been described in relation to steps 1116 and 1118 in accordance with the present invention. Of course, the toggle key may use different keys. That is, it may be assumed that the call key is used as the toggle key when the broadcast screen on which the call notification window is displayed is switched to the call screen. Moreover, it may be assumed that the broadcast service key is used as the toggle key when the call screen is switched to the broadcast screen on which the call notification window is displayed. Of course, different toggle keys may also be used.

When the pop-up window such as the call notification window is used and the user receives a message such as a short message service (SMS) message, a message identification window for identifying the received message does not necessarily need to be used. In accordance with another embodiment of the present invention, the user can identify content of the message using the pop-up window in the DMB terminal. Hereinafter, a pop-up window for displaying the content of the message is referred to as a message notification window.

In the following description, it is assumed that a type of received message is an SMS message. Of course, there are various types of messages such as a multimedia message service (MMS) message and so on. Even when text data is included in the MMS message, it can be extracted and displayed on the message notification window. Accordingly, the present invention is not limited to the SMS message.

Figure 13:
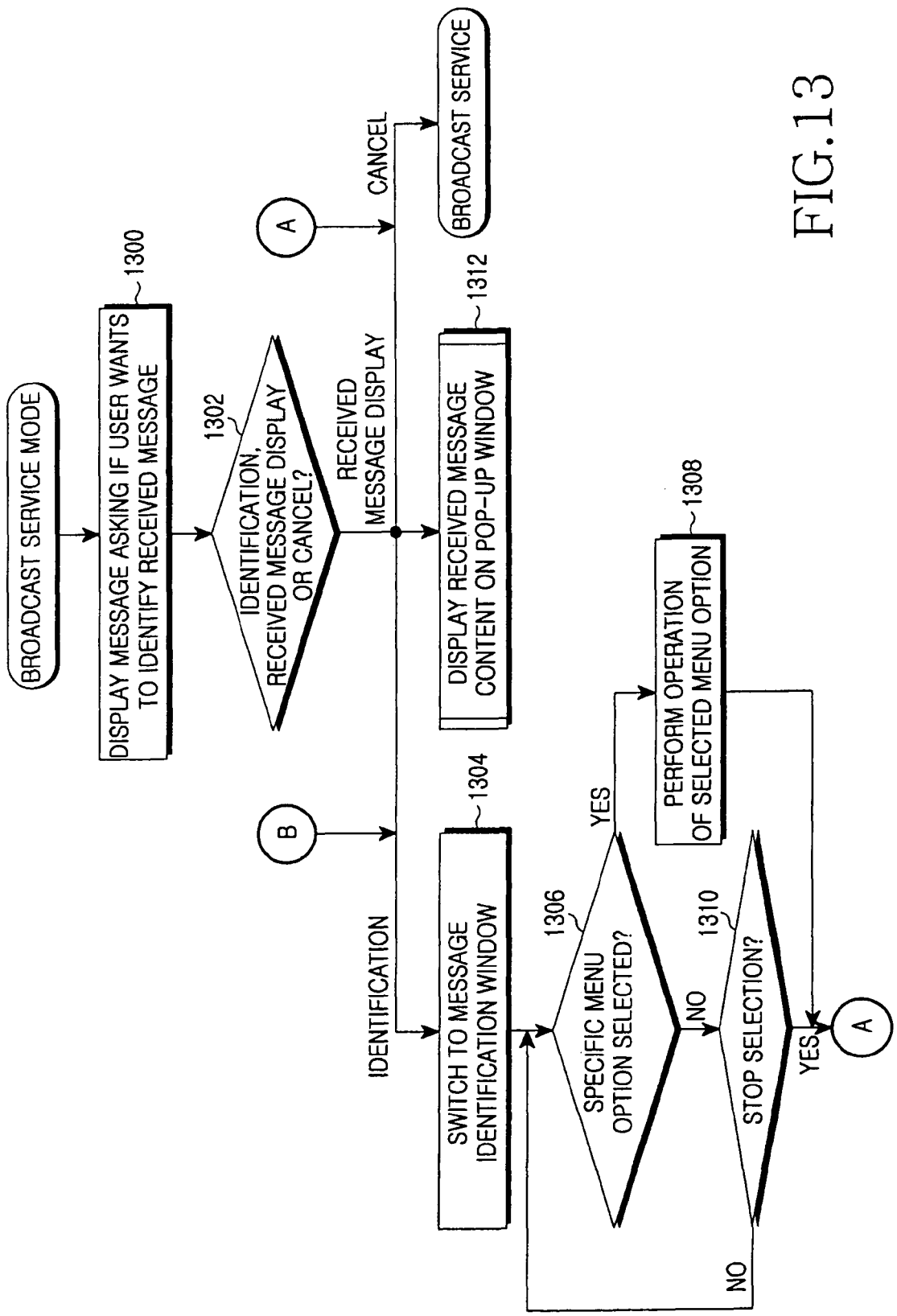
FIG. 13 is a flowchart illustrating an operation for displaying a received message when the concurrent service is provided in accordance with an embodiment of the present invention.
Figure 14:
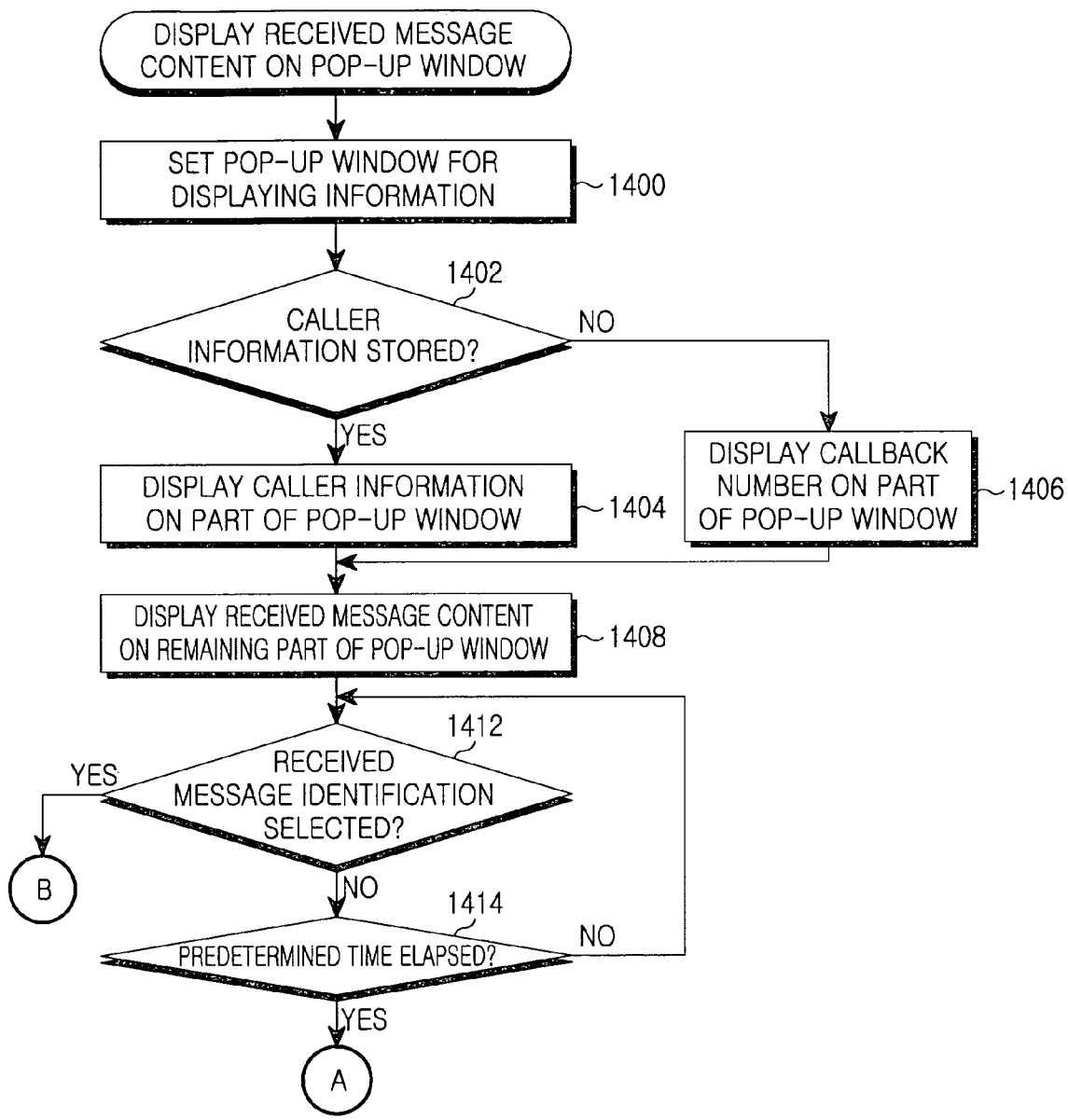
FIG. 14 is a flowchart illustrating an operation for displaying a received message when the concurrent service is provided in accordance with another embodiment of the present invention.
Figure 15:
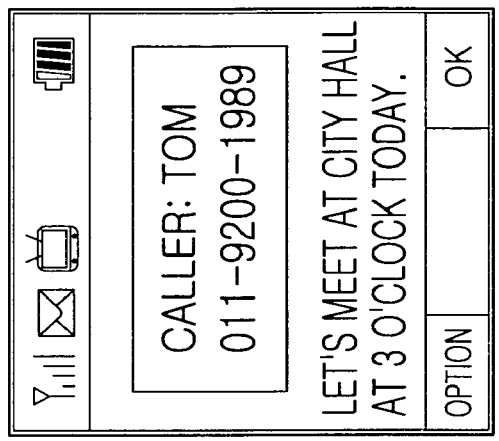
FIG. 15 is exemplary screens illustrating an operation for displaying a received message when the concurrent service is provided in accordance with an embodiment of the present invention.
Figure 15:
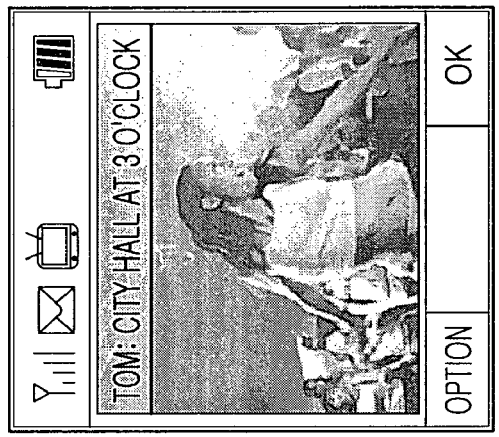
Figure 15:
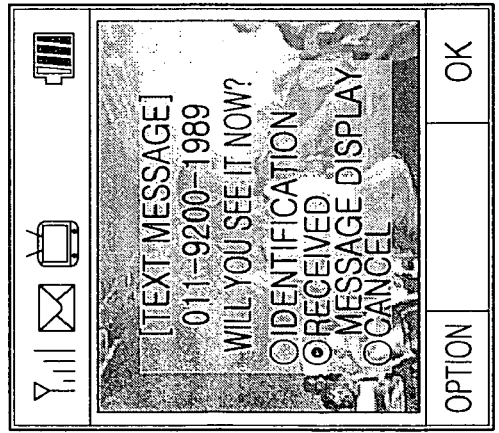

FIGS. 13, 14, and 15 illustrate an operation for displaying a received message through the message notification window when the concurrent service is provided in accordance with another embodiment of the present invention. Referring to FIG. 13, when a message is received in the broadcast service mode, the controller 170 proceeds to step 1300 to display a message asking if the user wants to identify the received message. FIG. 15(a) illustrates an example of displaying the message asking if the user wants to identify the received message in the form of the pop-up window.

In the DMB terminal of the present invention, the message asking includes a menu option for displaying the received message through the message notification window as in a "received message display" menu option of FIG. 15(a). Then, the controller 170 proceeds to step 1302 to determine whether to display a window for identifying the received message, whether to display content of the received message using the message notification window in a state in which the main screen is the broadcast screen, or whether to cancel the identification of the received message, according to the user's selection.

The case where the user selects a menu option for identifying the received message will be described. The controller 170 proceeds to step 1304 to switch the main screen to a window capable of identifying the received message.

FIG. 15(c) illustrates an example of the message identification window. The controller 170 displays the message content in the message identification window and then proceeds to step 1306 to determine if the user has selected a specific menu option such as a callback or callback number storage. If the user has not selected the specific menu option in step 1306, the controller 170 proceeds to step 1310 to determine if the user has input a key for closing the message identification window, for example, the end key. If the user has input the end key, the controller 170 closes the message identification window and again switches the broadcast service screen to the main screen.

However, if the user has selected the specific menu option in step 1306, the controller 170 proceeds to step 1308 to perform an operation based on the menu option selected by the user. Then, the controller 170 again switches the broadcast service screen to the main screen. Here, the specific menu option is any one of the menu options for storing a calling number of the received message and replying to the received message as described above.

On the other hand, when the user selects the "received message display" menu option in step 1302, the controller 170 proceeds to step 1312 to set an area of a message notification window for displaying the content of the received message and display the content of the received message in the set message notification window. The process of step 1312 will be described with reference to FIG. 14.

The process for displaying the content of the received message in the message notification window will be described with reference to FIG. 14. The controller 170 proceeds to step 1400 to set the area of the message notification window for displaying the received message. Then, the controller 170 proceeds to step 1402 to determine if caller information mapped to a callback number of the received message is pre-stored. If the caller information mapped to the callback number of the received message is pre-stored in step 1402, the controller 170 proceeds to step 1404 in which the pre-stored caller information is displayed in a part of the set message notification window area.

However, if caller information mapped to the callback number of the received message is not pre-stored in step 1402, the callback number can be displayed on the set message notification window. This example corresponds to step 1406 in which the callback number of the received message is used for the calling number when a pre-stored calling number is absent. In this case, a preset name, i.e., "non-designated", may be displayed instead of the callback number or the caller information may not be displayed.

Then, the controller 170 proceeds to step 1408 to display the content of the received message in the remaining part of the display area for the currently set message notification window. FIG. 15(b) illustrates an example in which the content of the received message and the caller information is displayed on the message notification window. From FIG. 15(b), it can be seen that the broadcast screen is displayed on the display unit 130 as in the concurrent service and the message notification window including the content and caller information of the received message is displayed on an upper part of the broadcast screen. When the length of the message notification window is not enough to display a total of the caller information and the message content, the message content can be displayed using a slide scheme. Accordingly, the content of the received message slides and moves in one direction, such that the user can easily read the total content of the received message even when the window length is not enough. Of course, the message content can be repeatedly displayed in a predetermined time period.

Then, the controller 170 proceeds to step 1412 to determine if the user has selected a menu option for identifying the received message. If the user has selected the menu option for identifying the received message in step 1412, the controller 170 proceeds to step 1304 to switch the main screen to the message identification window. Then, the controller 170 proceeds to the process of steps 1304 to 1310. At this time, the controller 170 displays the content of the received message in the message identification window, determines if the user has selected a specific menu option, and performs an operation based on the selected menu option.

Of course, a message displayed in the message notification window can be displayed only during a predetermined time in accordance with another embodiment of the present invention. In this case, if the user does not select the identification of the received message in step 1412, the controller 170 proceeds to step 1414 to determine if a predetermined time is elapsed after the content of the text message is displayed. After the predetermined time is elapsed, the message notification window is closed and simultaneously the concurrent service is stopped, such that only the broadcast service is provided to the user.

Although not illustrated in FIG. 13, an operation for switching to the screen of FIG. 15(b) can be performed when the user inputs a specific key in a state in which the message identification window as illustrated in FIG. 15(a) is displayed. For example, when the user inputs the call key in a state in which the message identification window is displayed, there can be performed an operation for switching to the screen for displaying the broadcast screen and displaying the content of the received message in the message notification window arranged on an upper part of the broadcast screen as illustrated in FIG. 15(b). Accordingly, the user can identify the content of the received message while watching the DMB if necessary.

Figure 16:
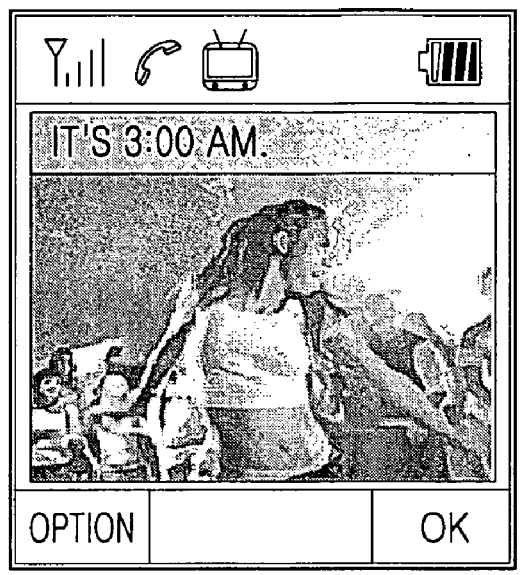
FIG. 16 illustrates exemplary screens for displaying time alarm and schedule alarm in accordance with an embodiment of the present invention.
Figure 16:
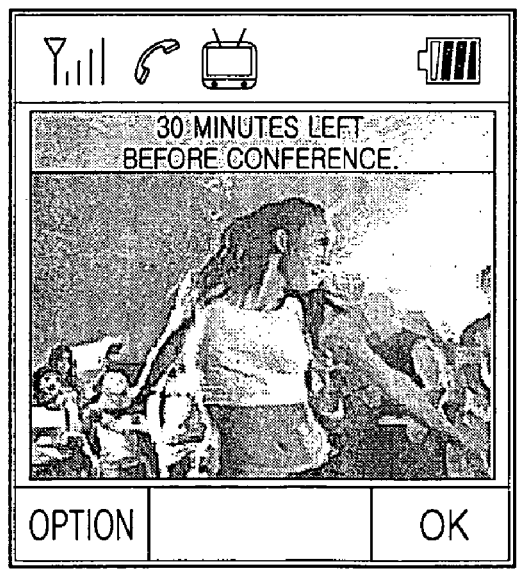

While the user watches the DMB, time alarm or schedule alarm set by the user can be displayed through a pop-up window. This example is illustrated in FIG. 16. FIG. 16(a) illustrates an example of the time alarm, and FIG. 16(b) illustrates an example of the schedule alarm.

FIG. 16(a) illustrates an example of displaying the time alarm at an associated time using the pop-up window during the DMB when the user sets the time alarm. In accordance with the present invention, the DMB terminal periodically checks the current time when the user sets the alarm time. When the alarm time set by the user is reached, the pop-up window is displayed at an associated time as illustrated in FIG. 16(a).

FIG. 16(a) illustrates an example in which an alarm time is set to 3:00 am. When 3:00 am is reached, the pop-up window as illustrated in FIG. 16(a) is displayed and the user is notified of an associated time. Accordingly, the user can easily recognize when the time set by the user is reached while watching the DMB.

FIG. 16(b) illustrates an example in which schedule alarm for giving notification of a schedule set by the user is displayed in addition to the time alarm when the user records the schedule associated with a specific time. In this case, when the time associated with the schedule input by the user is reached, the terminal for receiving the DMB in accordance with another embodiment of the present invention displays a pop-up window for notification of content of the schedule. When a total of the schedule content is not displayed on the pop-up window, the schedule content can be moved and repeatedly displayed in one direction according to the slide scheme.

While the user watches the DMB, the alarm can be displayed according to the schedule. Because both the time alarm and the schedule alarm use the pop-up window, the DMB watching is not stopped. According to the user's selection, the alarm can be released in the pop-up window for the time alarm or the schedule alarm. The pop-up window may be a Snooze pop-up window that continuously appears during a preset time period according to alarm setup.

As is apparent from the above description, the present invention can improve the convenience for users because they can transmit or receive a phone call while watching a broadcast without failing to watch a desired broadcast.

Although preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for providing a call service and a broadcast service in a digital multimedia broadcasting terminal, comprising the steps of:
   determining whether a message is received while the broadcast service is provided;
   displaying a message asking if a user wants to open the received message;
   setting a message notification window for displaying contents of the received message according to a user selection to open the received message on a first part of a main screen for outputting video signals relating to the broadcast service and not on a second part of the main screen;
   displaying the contents of the received message in the message notification window;
   determining whether a message open key is input when the contents of the received message are output to the message notification window;
   when the message open key is input, stopping output of the broadcast service on the main screen and displaying a message open window for opening the contents of the received message on all of the main screen;
   determining whether a specific key is input when the message open window is displayed on all of the main screen;
   when the specific key is input, stopping a display of the message open window and outputting the video signals of the broadcast service on the main screen; and
   outputting the message notification window for displaying the contents of the received message to the first part of the main screen.

2. The method of claim 1, further comprising the steps of:
   determining whether the message notification window has been displayed for a preset period of time; and
   closing the message notification window when the message notification window has been displayed for the preset period of time.

3. The method of claim 1, wherein the message notification window displays text included in the received message using a slide scheme.

4. The method of claim 1, further comprising the steps of:
   determining whether a length of the message notification window is enough to display the received message; and
   displaying the received message using a slide scheme-if when the length of the message notification window is not enough to display the received message.

5. The method of claim 4, wherein the message notification window repeatedly displays the contents of the received message during a preset period of time in the slide scheme.

6. The method of claim 1, wherein the message notification window displays a name preset by the user along with the contents of the received message when caller information mapped to a calling number associated with the received message is not stored.

7. A multi-tasking method in a digital broadcasting capable, wireless communication terminal, comprising the steps of:
   determining whether a call connection has been requested while displaying received broadcasting data on a main screen of the wireless communication terminal;
   transparently overlaying information about a called party, said information comprising at least one of a called party number and a called party name, on the broadcasting data while displaying the broadcasting data on the main screen during the call, when the call connection has been requested; and
   switching to a display of the information about the called party on all of the main screen and stopping the display of the broadcasting data on the main screen upon an input of a switching request, while receiving the broadcasting data; and
   switching to displaying the broadcasting data overlaid with the information about the called party upon the input of the switching request during displaying the information about the called party on all of the main screen.

8. A multi-tasking method in a digital broadcasting capable, wireless communication terminal, comprising:
   determining whether there is an incoming call while displaying broadcasting data on a main screen of the wireless communication terminal;
   determining whether a predetermined key is input to approve a call connection concerning the incoming call, when there is an incoming call;
   transparently overlaying information about the connected call on the broadcasting data while displaying the broadcasting data on the main screen during the call, when the predetermined key is input;
   switching to a display of the information about the connected call on all of the main screen and stopping the display of the broadcasting data on the main screen upon input of a switching request, while receiving the broadcasting data; and
   switching to displaying the broadcasting data overlaid with the information about the connected call upon the input of the switching request during displaying the information about the connected call on all of the main screen.

9. A multi-tasking method in a digital broadcasting capable, wireless communication terminal, comprising:
   determining whether there is an incoming call while displaying broadcasting data on a main screen of the wireless communication terminal;

transparently overlaying information about a caller in relation to the incoming call on the broadcasting data being displayed on the main screen, when there is an incoming call;

determining whether a predetermined key is input to approve a call connection concerning the incoming call;

transparently overlaying the information about the caller on the broadcasting data while displaying the broadcasting data on the screen during the call, when the predetermined key is input;

switching to a display of the information about the caller on all of the main screen and stopping the display of the broadcasting data on the main screen upon input of a switching request, while receiving the broadcasting data; and switching to displaying the broadcasting data overlaid with the information about the caller upon the input of the switching request during displaying the information about the caller on all of the main screen.

10. A multi-tasking method in a digital broadcasting capable, wireless communication terminal, comprising:

determining whether a communication service has been requested while displaying broadcasting data on a main screen;

determining whether a predetermined key is input to approve the communication service request, when a communication service has been requested;

continuing to display the broadcasting data on the main screen during the communication service provided in accordance with the input of the predetermined key, while transparently overlaying information about the communication service on the broadcasting data, when the predetermined key is input;

switching to a display of the information about the communication service on all of the main screen and stopping the display of the broadcasting data on the main screen upon input of a switching request, while receiving the broadcasting data; and switching to displaying the broadcasting data overlaid with the information about the communication service upon input of the switching request while displaying the information about the communication service on all of the main screen.

* * * * *